US012693129B2

(12) United States Patent
Matsumoto

(10) Patent No.: US 12,693,129 B2
(45) Date of Patent: Jul. 28, 2026

(54) CONTROL DEVICE FOR UPDATING AUTONOMOUS ROBOT MAP BASED ON SENSOR DATA

(71) Applicant: HONDA MOTOR CO., LTD., Tokyo (JP)

(72) Inventor: Kazuki Matsumoto, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 81 days.

(21) Appl. No.: 18/291,795

(22) PCT Filed: Jul. 26, 2021

(86) PCT No.: PCT/JP2021/027607
§ 371 (c)(1),
(2) Date: Jan. 24, 2024

(87) PCT Pub. No.: WO2023/007562
PCT Pub. Date: Feb. 2, 2023

(65) Prior Publication Data
US 2024/0255304 A1　　Aug. 1, 2024

(51) Int. Cl.
*G01C 21/30* (2006.01)
*G01C 21/00* (2006.01)
(Continued)

(52) U.S. Cl.
CPC ..... *G01C 21/3804* (2020.08); *G01C 21/1652* (2020.08); *G01S 17/89* (2013.01)

(58) Field of Classification Search
CPC ............... G01C 21/3848; G01C 21/30; G01C 21/3841; G01C 21/3804; G06V 10/75; G06V 20/58; G06V 20/64; G06V 20/653
See application file for complete search history.

(56) References Cited

U.S. PATENT DOCUMENTS

2019/0063929 A1 * 2/2019 Ohyama ............ G01C 21/3819
2020/0292323 A1 * 9/2020 Rabel .................... G01C 21/32
(Continued)

FOREIGN PATENT DOCUMENTS

JP　　H09-218955 A　　8/1997
JP　　2014-077769 A　　5/2014
(Continued)

OTHER PUBLICATIONS

Oct. 12, 2021, Translation of International Search Opinion issued for related PCT Application No. PCT/JP2021/027607.
(Continued)

*Primary Examiner* — Kenneth J Malkowski
(74) *Attorney, Agent, or Firm* — Paratus Law Group, PLLC

(57) ABSTRACT

An autonomous mobile robot (10) is capable of autonomously moving. A LiDAR (14*a*) is a three-dimensional sensor for three-dimensionally recognition of an external environment. A storage (12*a*) stores map data three-dimensionally indicating the external environment. A processor (11) controls an autonomous movement of the autonomous mobile robot (10) according to a position estimation based on sensing data of the LiDAR (14*a*) and the map data of the storage (12*a*). The processor (11) performs update control of the map data with the sensing data of the LiDAR (14*a*), based on a matching degree between sensing data of the LiDAR (14*a*) and the map data of the storage (12*a*).

9 Claims, 15 Drawing Sheets

(51) Int. Cl.
    G01C 21/16        (2006.01)
    G01S 17/89        (2020.01)

(56)             References Cited

U.S. PATENT DOCUMENTS

| | | |
|---|---|---|
| 2021/0231460 A1 | 7/2021 | Uno |
| 2023/0161045 A1* | 5/2023 | Chen .................... G01S 7/4808 |
| | | 702/152 |

FOREIGN PATENT DOCUMENTS

| | | |
|---|---|---|
| JP | 2019-040176 A | 3/2019 |
| JP | 2021-117048 A | 8/2021 |
| JP | 2021-117893 A | 8/2021 |

OTHER PUBLICATIONS

Oct. 12, 2021, Translation of International Search Report issued for related PCT Application No. PCT/JP2021/027607.

\* cited by examiner

TIME t1

FIG. 8
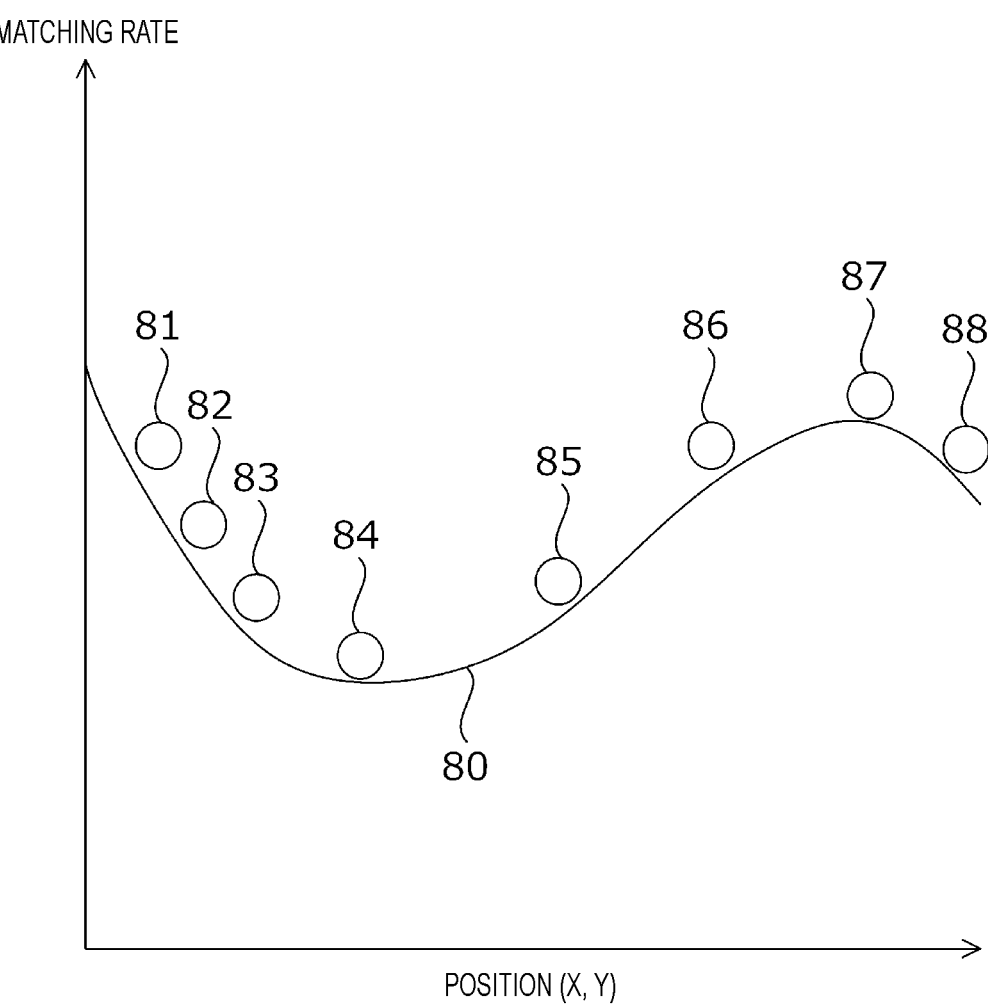
FIG. 9
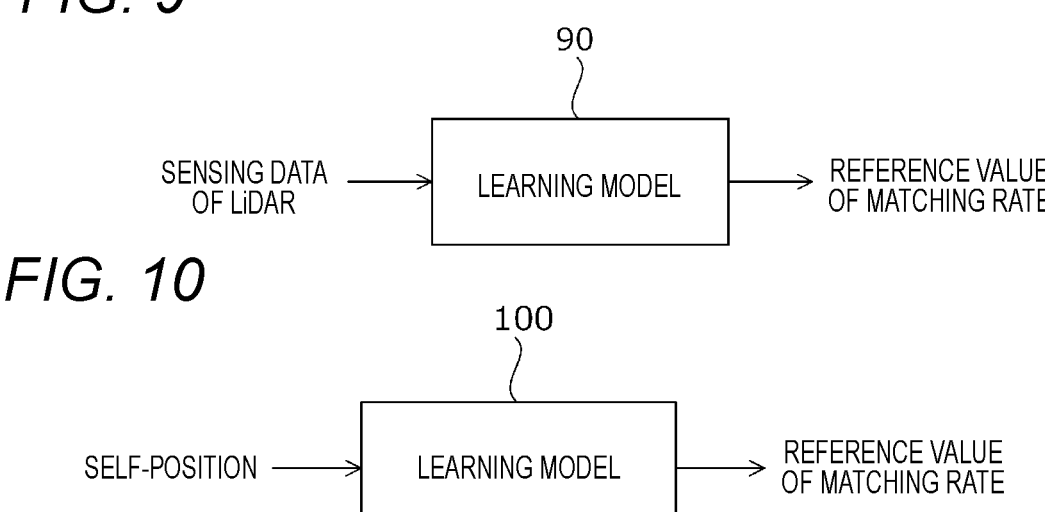
FIG. 10

CONTROL DEVICE FOR UPDATING AUTONOMOUS ROBOT MAP BASED ON SENSOR DATA

CROSS REFERENCE TO PRIOR APPLICATION

This application is a National Stage Patent Application of PCT International Patent Application No. PCT/JP2021/027607 (filed on Jul. 26, 2021) under 35 U.S.C. § 371, which is hereby incorporated by reference in its entirety.

TECHNICAL FIELD

The present disclosure relates to a control device.

BACKGROUND ART

Patent Literature 1 discloses creating stereoscopic image data based on image data obtained by imaging the surrounding landscape, comparing the stereoscopic image data with three-dimensional map data, and searching and displaying two-dimensional road map data with a position where the stereoscopic image data and the three-dimensional map data substantially match each other as a current position.

CITATION LIST

Patent Literature

Patent Literature 1: JPH09-218955A

SUMMARY OF INVENTION

Technical Problem

However, according to the related art, w % ben the surrounding environment (landscape) is largely changed, the matching accuracy between the stereoscopic image data based on imaging and the three-dimensional map data is reduced, and as a result, the accuracy of position recognition (position estimation) may be reduced.

The present disclosure provides a control device capable of preventing a decrease in accuracy of position estimation even if the surrounding environment changes.

Solution to Problem

An aspect of the present disclosure relates to a control device relating to a moving body, the moving body including a three-dimensional sensor for three-dimensional recognition of an external environment, and being capable of autonomously moving according to a position estimation based on sensing data obtained by the three-dimensional sensor and map data three-dimensionally indicating the external environment, the control device including:

a controller that performs update control of the map data with the sensing data, based on a matching degree between sensing data obtained by the three-dimensional sensor and the map data.

Advantageous Effects of Invention

According to the above aspect of the present disclosure, it is possible to prevent a decrease in accuracy of position estimation even if the surrounding environment changes.

BRIEF DESCRIPTION OF DRAWINGS

Exemplary embodiments of the present invention will be described in detail based on the following figures, wherein:

FIG. 8 is a graph for explaining a reference value of a matching rate;

FIG. 9 is a diagram illustrating an example of a learned model for calculating the reference value of the matching rate;

FIG. 10 is a diagram illustrating another example of the learned model for calculating the reference value of the matching rate;

DESCRIPTION OF EMBODIMENTS

Hereinafter, embodiments of a control device of the present disclosure will be described with reference to the accompanying drawings.

First Embodiment

Hereinafter, an autonomous mobile robot 10 as a first embodiment of a moving body to which a control device of the present disclosure is applied will be described with reference to the accompanying drawings.

<Appearance of Autonomous Mobile Robot 10>

Figure 1:
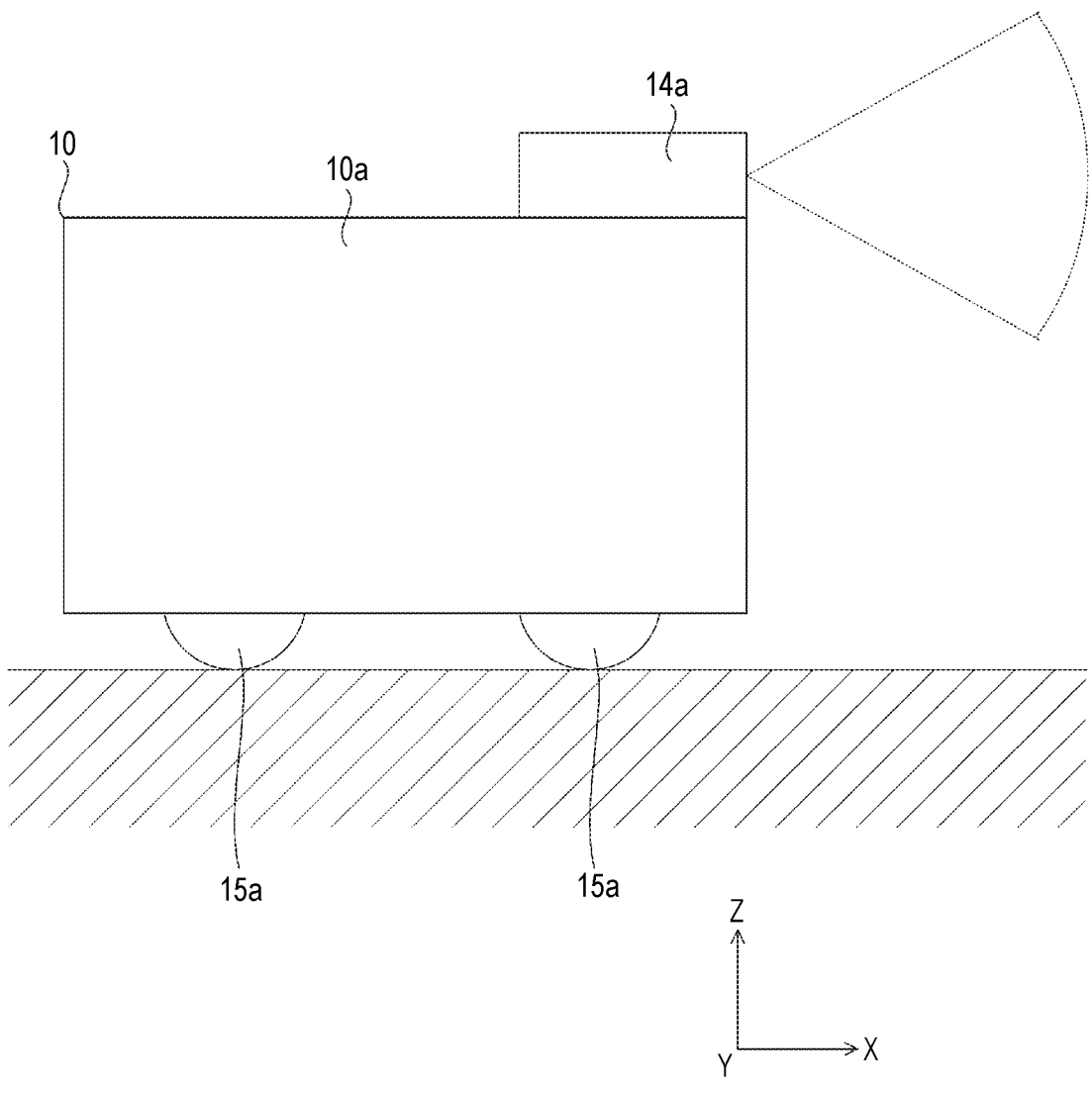
FIG. 1 is a diagram illustrating an example of the appearance of an autonomous mobile robot 10.

FIG. 1 is a diagram illustrating an example of the appearance of the autonomous mobile robot 10. The horizontal directions orthogonal to each other are defined as the X direction and the Y direction, and the vertical direction (gravity direction) is defined as the Z direction. FIG. 1 is a diagram of the autonomous mobile robot 10 viewed from the lateral side (Y direction). The autonomous mobile robot 10 is a robot capable of autonomous movement. The autonomous movement refers to a movement that is not controlled by a person, and includes, for example, a movement controlled by an external device capable of communicating with the autonomous mobile robot 10 (for example, a parent device having the autonomous mobile robot 10 as a child device).

As illustrated in FIG. 1, the autonomous mobile robot 10 includes a body 10a, a LiDAR (Light Detection And Ranging) 14a, and wheels 15a. The body 10a is provided with a processor for controlling the autonomous mobile robot 10, various devices according to the purpose of the autonomous mobile robot 10, and the like.

The LiDAR 14a is an example of a three-dimensional sensor for three-dimensionally recognizing the external environment of the autonomous mobile robot 10. The LiDAR 14a is, for example, capable of sensing the front in the autonomous movement of the autonomous mobile robot 10. A plurality of LiDARs 14a may be provided to be capable of sensing a plurality of directions. The LiDAR 14a may be capable of panning (or tilting), zooming, or the like.

The wheels 15a are an example of a movement mechanism for the autonomous mobile robot 10 to move, and are provided, for example, at four positions on the bottom of the body 10a. The wheels 15a are driven by an actuator such as a motor unit provided in the body 10a, and enable the autonomous mobile robot 10 to travel and change its direction.

<Environment and Movement Route in which Autonomous Mobile Robot 10 Moves Autonomously>

Figure 2:
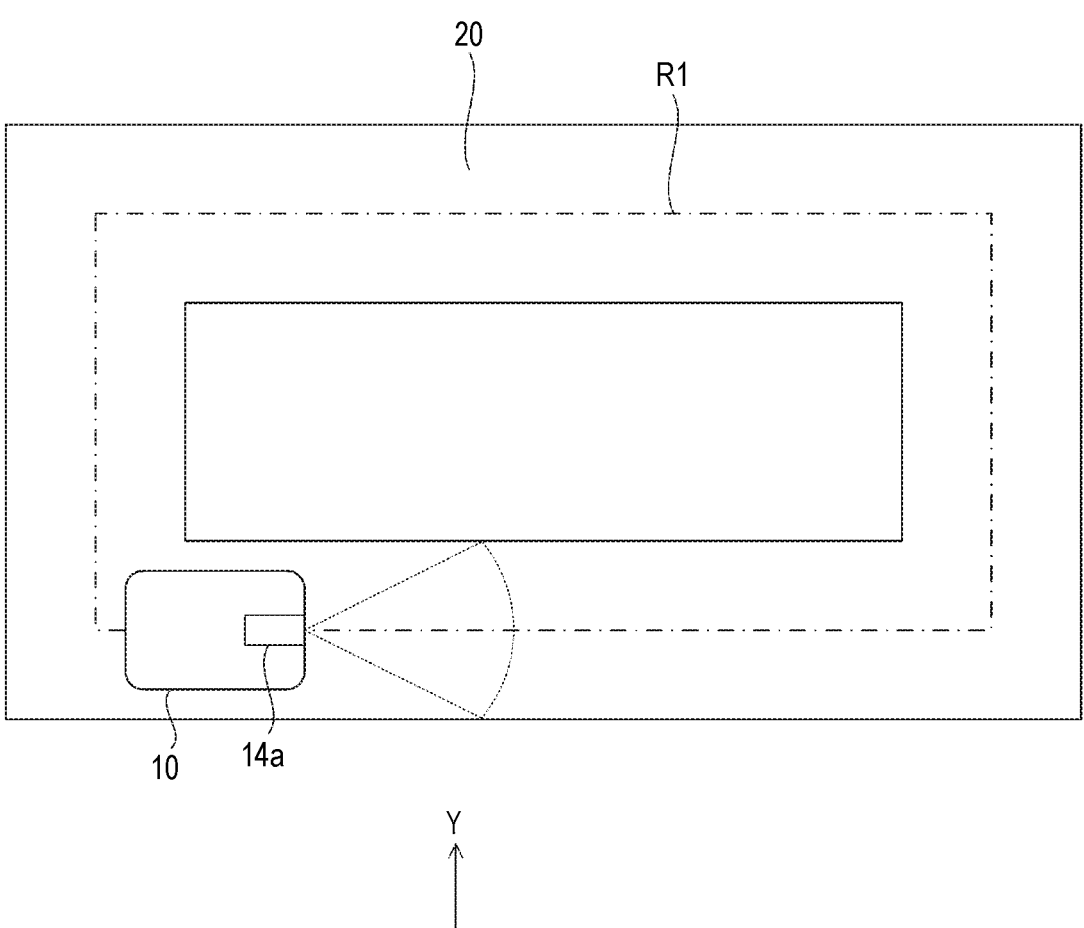
FIG. 2 is a diagram illustrating an example of the environment and the movement route in which the autonomous mobile robot 10 moves autonomously.

FIG. 2 is a diagram illustrating an example of the environment and the movement route in which the autonomous mobile robot 10 moves autonomously. FIG. 2 is a diagram of the autonomous mobile robot 10 as viewed from above (Z direction). The autonomous mobile robot 10 moves autonomously along a set movement route R1 in the environment 20, for example. In the example illustrated in FIG. 2, the environment 20 is a rectangular ring road and its surroundings. The movement route R1 is a rectangular ring route along the center of the rectangular ring road.

The autonomous mobile robot 10 stores map data three-dimensionally indicating the environment 20 as the external environment of the autonomous mobile robot 10. The initial map data stored in the autonomous mobile robot 10 is generated, for example, by acquiring the sensing data of the LiDAR 14a and accumulating the acquired sensing data while moving the autonomous mobile robot 10 in the environment 20 without changes in the environment 20. The movement of the autonomous mobile robot 10 may be autonomous movement, or may be a movement by a person operating a remote controller to operate the autonomous mobile robot 10.

Alternatively, the initial map data stored in the autonomous mobile robot 10 may be generated by accumulating the sensing data of another device (for example, a sensor of a smartphone or a tablet terminal) instead of accumulating the sensing data of the LiDAR 14a. The initial map data stored in the autonomous mobile robot 10 may be generated by CAD (computer-aided design) or the like instead of sensing.

<Hardware Configuration of Autonomous Mobile Robot 10>

Figure 3:
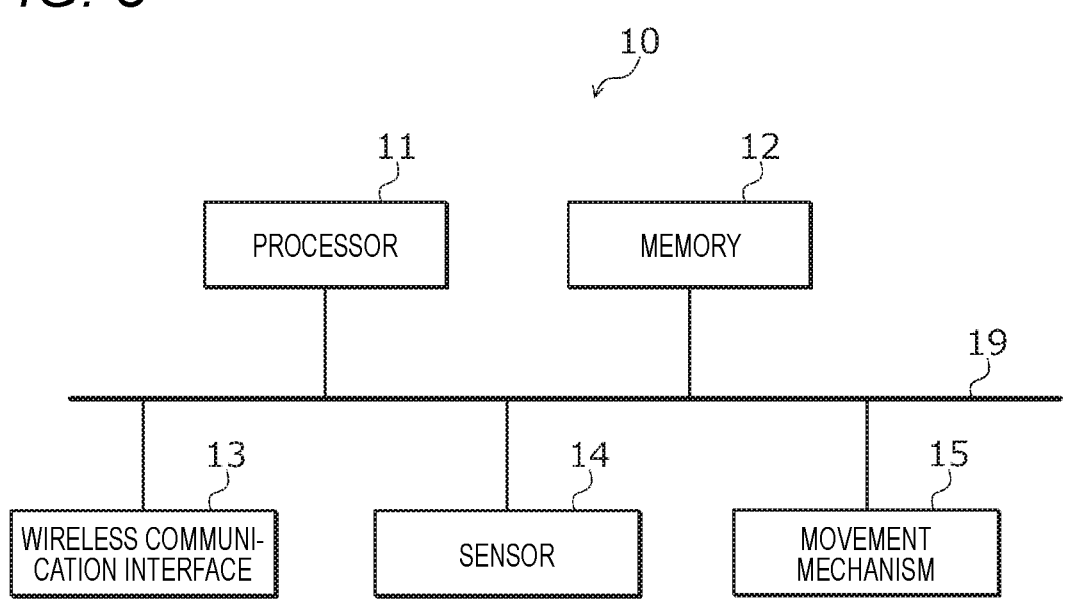
FIG. 3 is a diagram illustrating an example of the hardware configuration of the autonomous mobile robot 10.

FIG. 3 is a diagram illustrating an example of the hardware configuration of the autonomous mobile robot 10. For example, as illustrated in FIG. 3, the autonomous mobile robot 10 illustrated in FIGS. 1 and 2 includes a processor 11, a memory 12, a wireless communication interface 13, a sensor 14, and a movement mechanism 15. The processor 11, the memory 12, the wireless communication interface 13, the sensor 14, and the movement mechanism 15 are connected by, for example, a bus 19. The processor 11 is an example of the control device of the present disclosure. The memory 12 is an example of the storage unit of the present disclosure.

The processor 11 is a circuit for processing signals, and is, for example, a CPU (Central Processing Unit) for controlling the entire autonomous mobile robot 10. The processor 11 may be achieved with another digital circuit such as an FPGA (Field Programmable Gate Array) or a DSP (Digital Signal Processor). The processor 11 may be achieved by combining a plurality of digital circuits.

The memory 12 includes, for example, a main memory and an auxiliary memory. The main memory is, for example, a RAM (Random Access Memory). The main memory is used as the work area of the processor 11.

The auxiliary memory is a nonvolatile memory such as a magnetic disk, an optical disk, or a flash memory. The auxiliary memory stores various programs for operating the autonomous mobile robot 10. The programs stored in the auxiliary memory are loaded into the main memory and executed by the processor 11. The map data is stored in, for example, the auxiliary memory of the memory 12.

The auxiliary memory may include a portable memory detachable from the autonomous mobile robot 10. Examples of the portable memory include a USB (Universal Serial Bus) flash drive, a memory card such as an SD (Secure Digital) memory card, and an external hard disk drive.

The wireless communication interface 13 is a communication interface for performing wireless communication with the outside of the autonomous mobile robot 10 (for example, the parent device of the autonomous mobile robot 10). The wireless communication interface 13 is controlled by the processor 11.

The sensor 14 includes various sensors capable of acquiring information on the external environment of the autonomous mobile robot 10, information on the moving state of the autonomous mobile robot 10, and the like. The sensor 14 is controlled by the processor 11, and sensing data of the sensor 14 is acquired by the processor 11. The LiDAR 14a illustrated in FIG. 1 is provided in the sensor 14. A specific example of the sensor 14 will be described with reference to FIG. 4.

The movement mechanism 15 is a mechanism for the autonomous mobile robot 10 to move autonomously. For example, the wheels 15a are the wheels 15a illustrated in FIG. 1. However, the movement mechanism 15 is not limited to the wheels 15a, and may be walking legs or the like. The movement mechanism 15 is controlled by the processor 11. In the following example, the movement mechanism 15 is assumed as the wheels 15a.

<Specific Configuration of Processor 11, Memory 12, and Sensor 14 of Autonomous Mobile Robot 10>

Figure 4:
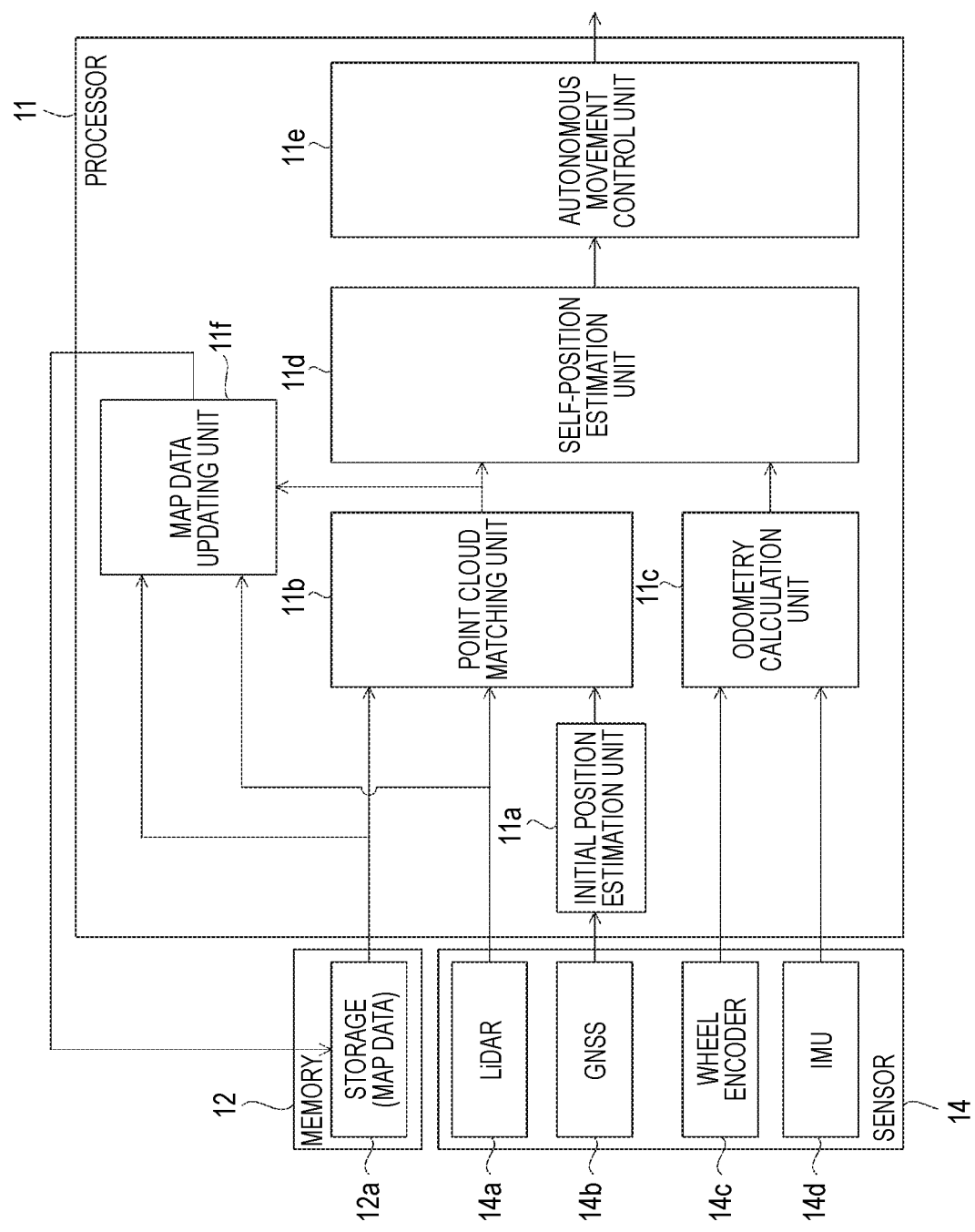
FIG. 4 is a diagram illustrating an example of the specific configuration of a processor 11, a memory 12, and a sensor 14 of the autonomous mobile robot 10.

FIG. 4 is a diagram illustrating an example of the specific configuration of the processor 11, the memory 12, and the sensor 14 of the autonomous mobile robot 10.

The memory 12 includes, for example, a storage 12a as the auxiliary memory. The storage 12a stores map data three-dimensionally indicating the environment 20 as the external environment of the autonomous mobile robot 10.

The sensor 14 includes, for example, a LiDAR 14*a*, a GNSS (Global Navigation Satellite System) profile 14*b*, a wheel encoder 14*c*, and an IMU (Inertial Measurement Unit) 14*d*.

As described above, the LiDAR 14*a* is a three-dimensional sensor for three-dimensionally recognizing the environment 20 as the external environment of the autonomous mobile robot 10. Specifically, the LiDAR 14*a* measures the distance and direction to an object by emitting a laser beam and measuring the time until the emitted laser beam hits the object and bounces back.

The GNSS 14*b* is a device for measuring the position of the autonomous mobile robot 10 by receiving a signal emitted from an artificial satellite. The GNSS 14*b* is, for example, a GPS (Global Positioning System). The wheel encoder 14*c* is a sensor for measuring the rotation speed of the wheels 15*a* (wheel speed). The IMU 14*d* is a sensor for measuring the accelerations in each of the front-rear direction, the left-right direction, and the upper-lower direction of the autonomous mobile robot 10, and the angular velocities in each of the pitch direction, the roll direction, and the yaw direction.

The processor 11 includes an initial position estimation unit 11*a*, a point cloud matching unit 11*b*, an odometry calculation unit 11*c*, a self-position estimation unit 11*d*, an autonomous movement control unit 11*e*, and a map data updating unit 11*f*. These functional units of the processor 11 are achieved, for example, by the processor 11 executing the programs stored in the memory 12.

In an initial stage of position estimation of the autonomous mobile robot 10, the initial position estimation unit 11*a* performs position estimation of the autonomous mobile robot 10 (initial position estimation) based on the position information on the autonomous mobile robot 10 obtained by the GNSS 14*b*. For example, the initial position estimation unit 11*a* estimates the rough position of the autonomous mobile robot 10 in the environment 20 indicated by the map data of the storage 12*a* as the initial position of the autonomous mobile robot 10 based on the position information on the autonomous mobile robot 10 obtained by the GNSS 14*b*.

The point cloud matching unit 11*b* performs point cloud matching between the map data of the storage 12*a* and the sensing data of the LiDAR 14*a* (scanning point cloud), and calculates the matching rate (likelihood) with the sensing data of the LiDAR 14*a* for each position in the environment 20 indicated by the map data. At this time, the point cloud matching unit 11*b* can efficiently perform point cloud matching particularly in the initial stage by performing point cloud matching based on the initial position of the autonomous mobile robot 10 estimated by the initial position estimation unit 11*a*.

The odometry calculation unit 11*c* calculates the movement amount and the posture of the autonomous mobile robot 10 based on the sensing data of the wheel encoder 14*c* (the rotation speed of the wheels 15*a*) and the sensing data of the IMU 14*d* (the acceleration and the angular velocity of the autonomous mobile robot 10).

The self-position estimation unit 11*d* performs position estimation of the autonomous mobile robot 10 (self-position estimation) based on the result of the point cloud matching by the point cloud matching unit 11*b*. For example, if the positions of the environment 20 indicated by the map data includes a position whose matching rate with the sensing data of the LiDAR 14*a* is equal to or greater than a threshold, the self-position estimation unit 11*d* estimates the position as the position of the autonomous mobile robot 10.

The self-position estimation unit 11*d* may further perform the self-position estimation of the autonomous mobile robot 10 under the supplement of the movement amount and the posture of the autonomous mobile robot 10 calculated by the odometry calculation unit 1I c. As an example, it is assumed that the self-position estimation based on the sensing data of the LiDAR 14*a* is performed at a cycle of 10 [Hz], and the movement amount and the posture of the autonomous mobile robot 10 are calculated by the odometry calculation unit 11*c* at a cycle of 10 [Hz]. In this case, the self-position estimation unit 11*d* interpolates the self-position estimation in a period in which the self-position estimation based on the sensing data of the LiDAR 14*a* is not performed, based on the movement amount and the posture of the autonomous mobile robot 10 by the odometry calculation unit 11*c*.

The self-position estimation by the self-position estimation unit 11*d* may include the estimation of the posture of the autonomous mobile robot 10. For example, if the autonomous mobile robot 10 moves autonomously only in the horizontal direction (XY direction) as in the example of FIG. 2, the initial position estimation unit 11*a* outputs (x, y, θ) as a result of the self-position estimation, indicating the position x in the X direction of the autonomous mobile robot 10, the position y in the Y direction of the autonomous mobile robot 10, and the posture θ (inclination) of the autonomous mobile robot 10.

The autonomous movement control unit 11*e* controls the autonomous movement of the autonomous mobile robot 10 based on the result of the position estimation of the autonomous mobile robot 10 by the self-position estimation unit 11*d*. For example, the autonomous mobile robot 10 moves autonomously along the predetermined movement route R1 as described above. The autonomous movement control unit 11*e* calculates the drive parameters (for example, the drive direction and the drive amount) of the movement mechanism 15 for the autonomous mobile robot 10 to move from the current location to the next target position based on the result of the position estimation of the autonomous mobile robot 10, and performs control to drive the movement mechanism 15 (wheels 15*a*) based on the calculated drive parameters.

The map data updating unit 11*f* updates the map data of the storage 12*a* based on the result of the point cloud matching by the point cloud matching unit 11*b*. Specifically, in a case where the matching rate between the map data of the storage 12*a* and the sensing data of the LiDAR 14*a* is lower than a first matching rate (first matching degree), the map data updating unit 11*f* determines that the environment 20 has changed, and updates the map data of the storage 12*a* based on the sensing data of the LiDAR 14*a*.

For example, in a case where the maximum matching rate among the matching rates for the respective positions of the environment 20 indicated by the map data is lower than the first matching rate (first matching degree), the map data updating unit 11*f* updates the map data by replacing the data of the position having the maximum matching rate among the positions of the environment 20 indicated by the map data with the data based on the sensing data of the LiDAR 14*a*

<Changes in Environment 20>

Figure 5:
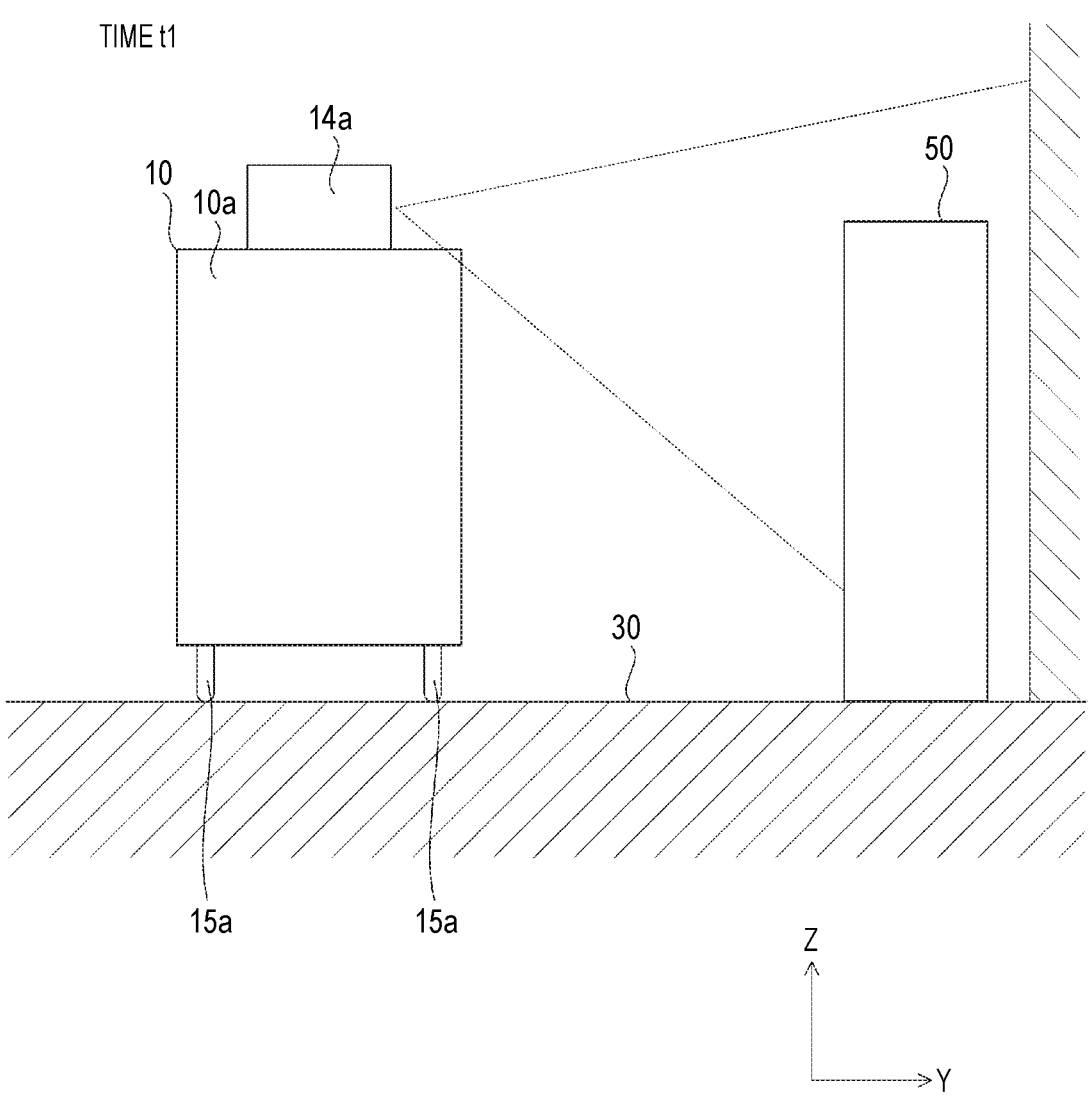
FIG. 5 is a diagram (part 1) illustrating an example of a change in the environment 20.
Figure 6:
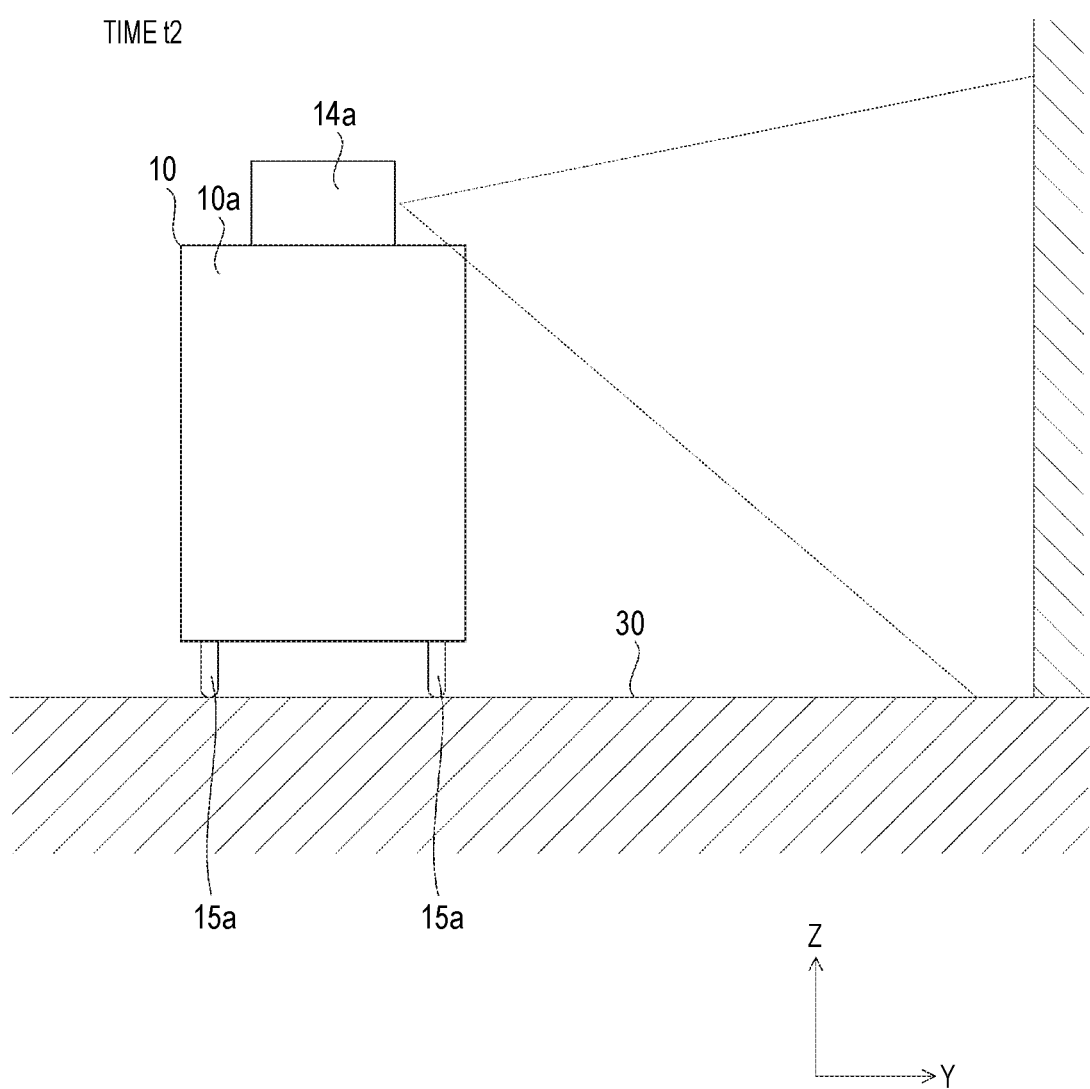
FIG. 6 is a diagram (part 2) illustrating an example of a change in the environment 20.

FIGS. 5 and 6 are diagrams illustrating an example of a change in the environment 20. FIGS. 5 and 6 are diagrams of the autonomous mobile robot 10 viewed from the front (X direction). For example, it is assumed that an object 50 is present in the detection range of the LiDAR 14*a* as illustrated in FIG. 5 until a time t1 in a certain position of the environment 20. The object 50 is, for example, a bicycle. In this case, the map data of the storage 12a is map data including the object 50.

It is assumed that the object 50 is not present in the detection range of the LiDAR 14a as illustrated in FIG. 6 at a time t2 at which the autonomous mobile robot 10 moves to the same position as that of FIG. 5 again after the time t1. Examples of such a situation include a situation in which the object 50 is removed between the time t1 and the time t2. In this case, the matching accuracy between the sensing data of the LiDAR 14a and the map data of the storage 12a decreases, which increases errors of the self-position estimation of the autonomous mobile robot 10.

In such a case, the map data updating unit 11f of the processor 11 performs update control to update the map data of the storage 12a with the sensing data of the LiDAR 14a. Accordingly, the map data of the storage 12a becomes map data indicating the environment 20 without including the object 50. Therefore, the matching accuracy between the sensing data of the LiDAR 14a and the map data of the storage 12a is increased, which can reduce the errors of the self-position estimation of the autonomous mobile robot 10.

<Processing by Autonomous Mobile Robot 10>

Figure 7:
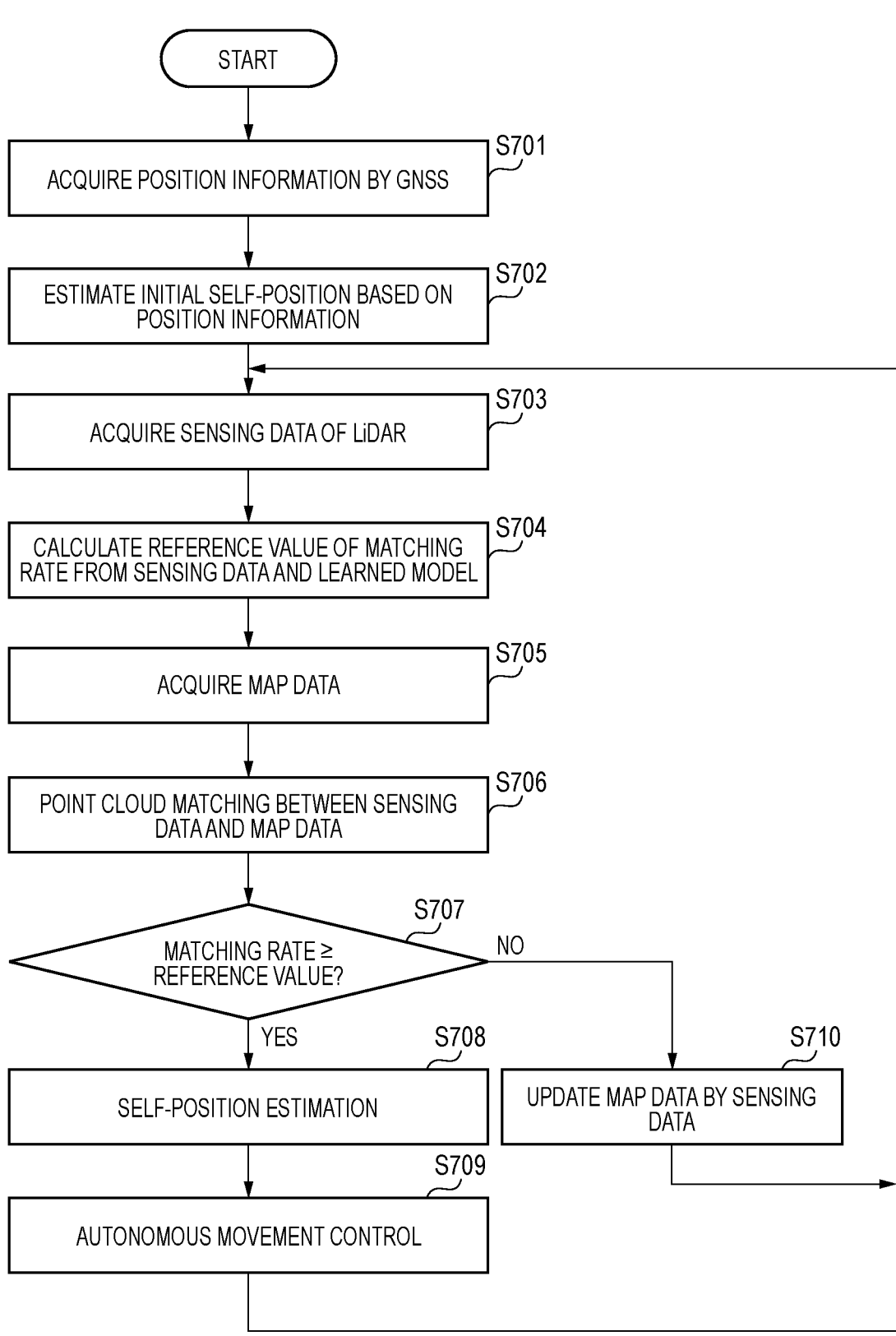
FIG. 7 is a flowchart illustrating an example of the processing by the autonomous mobile robot 10.

FIG. 7 is a flowchart illustrating an example of the processing by the autonomous mobile robot 10. The processor 11 of the autonomous mobile robot 10 executes, for example, the processing illustrated in FIG. 7. First, the processor 11 acquires position information on the autonomous mobile robot 10 by the GNSS 14b (step S701).

Next, the processor 11 estimates the initial self-position of the autonomous mobile robot 10 based on the position information acquired in step S701 (step S702). The initial self-position of the autonomous mobile robot 10 is a rough position of the autonomous mobile robot 10 in the environment 20 in which the autonomous mobile robot 10 moves autonomously.

Next, the processor 11 acquires sensing data of the LiDAR 14a (step S703). Next, the processor 11 calculates a reference value of the matching rate based on the sensing data acquired in step S703 as the first matching rate from the sensing data acquired in step S703 and a learned model (step S704).

The reference value of the matching rate based on the sensing data is an estimated value of the matching rate between the sensing data and the map data on the assumption that the environment 20 in which the autonomous mobile robot 10 moves autonomously does not change (that is, the map data of the storage 12a matches the environment 20). The reference value of the matching rate may be a matching rate lower than the estimated value of the matching rate by a predetermined margin. The reference value of the matching rate based on the sensing data is obtained, for example, by inputting the sensing data to a learned model with the sensing data being the input and the reference value of the matching rate being the output. The reference value of the matching rate and the learned model will be described later (see FIGS. 8 to 10).

Next, the processor 11 acquires the map data from the storage 12a (step S705). Next, the processor 11 performs point cloud matching between the sensing data of the LiDAR 14a acquired in step S703 and the map data acquired in step S705 (step S706).

Next, the processor 11 determines whether the matching rate calculated in the point cloud matching in step S706 is equal to or greater than the reference value calculated in step S704 (step S707). If the matching rate is equal to or greater than the reference value (step S707: Yes), the processor 11 performs self-position estimation for estimating the position of the autonomous mobile robot 10 based on the result of the point cloud matching in step S706 (step S708). In the self-position estimation, the processor 11 may estimate the position of the autonomous mobile robot 10 in consideration of the calculation result by the odometry calculation unit 11c.

Next, the processor 11 performs autonomous movement control of the autonomous mobile robot 10 based on the result of the self-position estimation in step S708 (step S709), and returns to step S703. For example, the processor 11 calculates drive parameters of the wheels 15a for moving from the current location of the autonomous mobile robot 10 obtained by the self-position estimation to the next target position, and performs control to drive the wheels 15a based on the calculated drive parameters.

In step S707, if the matching rate is not equal to or greater than the reference value (step S707: No), the processor 11 updates the map data of the storage 12a with the sensing data of the LiDAR 14a acquired in step S703 (step S710), and returns to step S703.

<Reference Value of Matching Rate>

FIG. 8 is a graph for explaining the reference value of the matching rate. In FIG. 8, the horizontal axis indicates the position (X, Y) on the movement route R1 of the autonomous mobile robot 10, and the vertical axis indicates the matching rate between the sensing data of the LiDAR 14a and the map data.

The matching rates 81 to 88 indicate the matching rates between the sensing data of the LiDAR 14a at each position on the movement route R1 and the map data. The matching rates are calculated in a state where the environment 20 does not change (that is, a state where the map data of the storage 12a matches the environment 20).

As indicated by the matching rates 81 to 88, the matching rate between the sensing data of the LiDAR 14a and the map data varies depending on the position on the movement route R1 even if the environment 20 does not change. This is because the matching rate between the sensing data of the LiDAR 14a and the map data differs depending on the shape, material, and the like of each place.

For example, the matching rate is high in a place where no dynamic objects exist within the sensing range of the LiDAR 14a. On the other hand, the matching rate is low due to fluctuation or the like caused by the wind in a place where a forest exists within the sensing range of the LiDAR 14a. In such a place, the matching rate between the sensing data of the LiDAR 14a and the map data remains low even if the map data of the storage 12a is updated based on the sensing data of the LiDAR 14a.

The reference value 80 is a reference value of the matching rate. The reference value 80 is determined based on, for example, the matching rates 81 to 88. The processor 11 calculates the reference value of the matching rate for each place based on the sensing data of the LiDAR 14a, and updates the map data of the storage 12a with the sensing data of the LiDAR 14a in a case only where the matching rate between the sensing data of the LiDAR 14a and the map data is less than the reference value.

Accordingly, the autonomous movement control and the update of the map data can be appropriately performed in a place where the matching rate is low even if the environment 20 does not change. For example, the reference value 80 is low in a place where a forest exists within the sensing range of the LiDAR 14a. Therefore, the matching rate does not fall below the reference value 80 in such a place even if there is fluctuation due to the wind, and the map data is not updated.

On the other hand, the matching rate falls below the reference value 80 in a case where the matching rate greatly decreases due to a change in the environment, and the map data is updated.

<Learned Model for Calculating Reference Value of Matching Rate>

FIG. 9 is a diagram illustrating an example of the learned model for calculating the reference value of the matching rate. The processor 11 can access, for example, a learned model 90 illustrated in FIG. 9. The learned model 90 may be stored in the memory 12 or may be stored in a device outside the autonomous mobile robot 10.

The learned model 90 is a learned model with the sensing data of the LiDAR 14*a* being the input and the reference value of the matching rate between the sensing data of the LiDAR 14*a* and the map data being the output. For example, in step S704 illustrated in FIG. 7, the processor 11 derives the reference value of the matching rate output from the learned model 90 by inputting the sensing data of the LiDAR 14*a* obtained in step S703 to the learned model 90.

The learned model 90 can be generated by, for example, with the autonomous mobile robot 10 moving autonomously in a state where the environment 20 does not change, repeatedly acquiring the sensing data of the LiDAR 14*a* and calculating the matching rate between the acquired sensing data and the map data of the storage 12*a*, and performing deep learning or machine learning using the acquired sensing data and the calculated matching rate as labeled training data. The machine learning may be performed before the operation of the autonomous mobile robot 10, during the operation of the autonomous mobile robot 10, or a combination thereof.

FIG. 10 is a diagram illustrating another example of the learned model for calculating the reference value of the matching rate. The processor 11 may be capable of accessing, for example, a learned model 100 illustrated in FIG. 10. The learned model 100 may be stored in the memory 12 or may be stored in a device outside the autonomous mobile robot 10.

The learned model 100 is a learned model with the estimated position of the autonomous mobile robot 10 being the input and the reference value of the matching rate between sensing data of the LiDAR 14*a* and the map data being the output. For example, in step S704 illustrated in FIG. 7, the processor 11 may derive the reference value of the matching rate output from the learned model 100 by inputting the currently estimated position of the autonomous mobile robot 10 to the learned model 100. The position of the autonomous mobile robot 10 may be a rough position, and is estimated based on, for example, the result of the directly previous self-position estimation or the calculation result by the odometry calculation unit 11*c*.

The learned model 100 can be generated by, for example, with the autonomous mobile robot 10 moving autonomously in a state where the environment in which the autonomous mobile robot 10 moves autonomously does not change, repeatedly calculating the matching rate between the acquired sensing data and the map data of the storage 12*a* and performing the self-position estimation, and performing deep learning or machine learning using the calculated matching rate and the estimated self-position as labeled training data. The machine learning may be performed before the operation of the autonomous mobile robot 10, during the operation of the autonomous mobile robot 10, or a combination thereof.

<Other Examples of Processing by Autonomous Mobile Robot 10>

Figure 11:
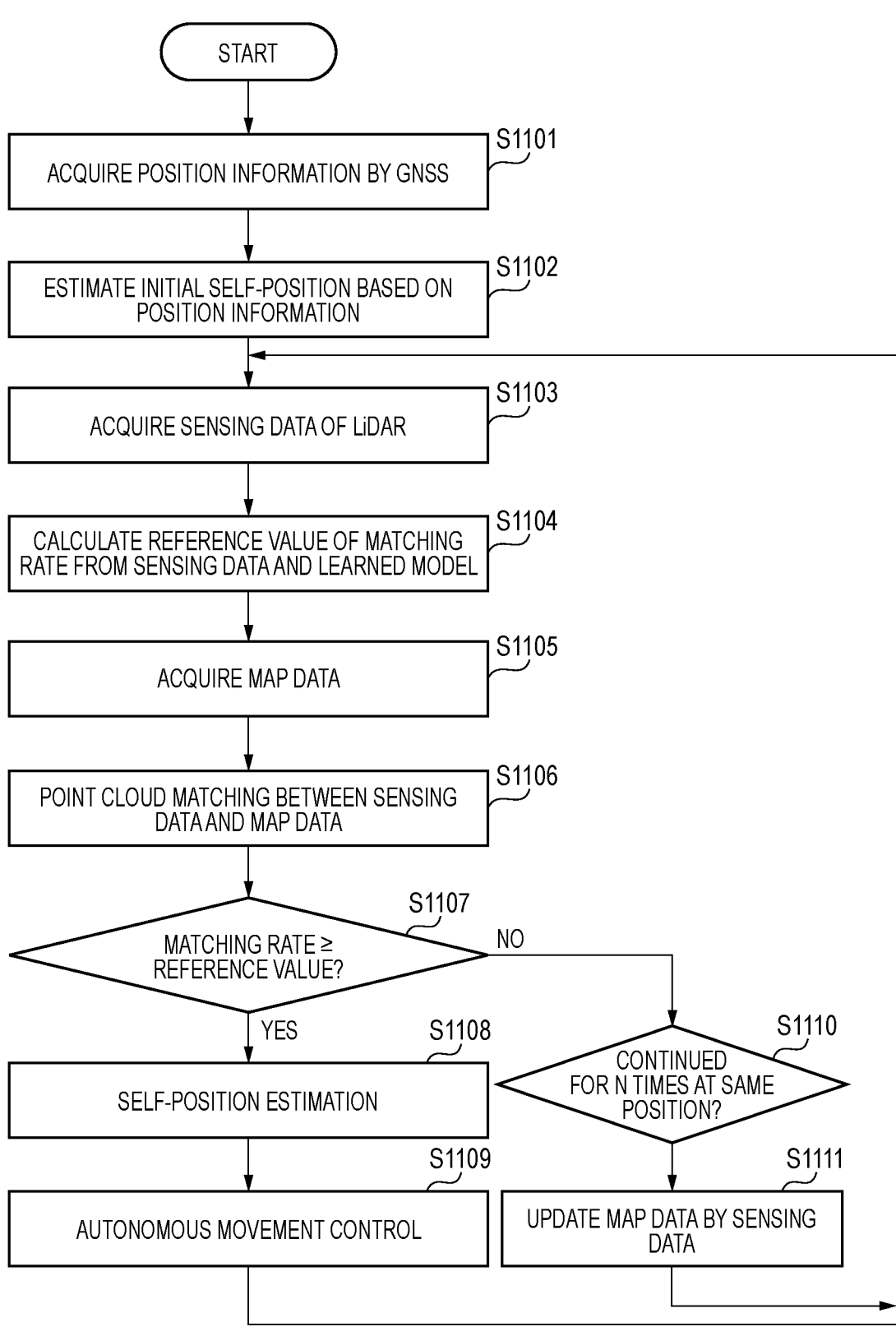
FIG. 11 is a flowchart illustrating another example of the processing by the autonomous mobile robot 10.

FIG. 11 is a flowchart illustrating another example of the processing by the autonomous mobile robot 10. The processor 11 of the autonomous mobile robot 10 may execute the processing illustrated in FIG. 11. Steps S1101 to S1109 illustrated in FIG. 11 are the same as steps S701 to S709 illustrated in FIG. 7.

In step S1107, if the matching rate is not equal to or greater than the reference value (step S1107: No), the processor 11 determines whether a state where the matching rate is not equal to or greater than the reference value has continued N times at the same position (step S1110). N is a natural number of 2 or more.

For example, the movement route R1 is divided into a plurality of sections, and the processor 11 stores the determination result of step S1107 as history information for each section. Then, in step S1110, the processor 11 refers to the history information on the section in which the autonomous mobile robot 10 is currently located, and determines whether a state where the matching rate is not equal to or greater than the reference value has continued N times at the same position (section).

In step S11, if not continued N times (step S1110: No), the processor 11 returns to step S1103. If continued N times (step S1110: Yes), the processor 11 updates the map data of the storage 12*a* with the sensing data of the LiDAR 14*a* acquired in step S1103 (step S1111), and returns to step S1103.

According to steps S1110 and S1111, the update control of the map data can be performed in the case where the matching rate is lower than the reference value continuously at a plurality of times (N times) at which the autonomous mobile robot 10 exists at the same position (section).

As illustrated in FIG. 11, the map data is not updated immediately if the matching rate between the map data and the sensing data is lower than the reference value only once, and the map data is updated in the case where the matching rate remains lower than the reference value at the same place (N−1) more times. Therefore, the map data can be prevented from being updated in the case where the environmental change is temporary, such as a person standing. N is a predetermined numerical value. Alternatively, the processor 11 may determine N based on the variation frequency or the like of the matching rate in the environment 20 in the past.

Second Embodiment

Hereinafter, an autonomous mobile robot 10 as an autonomous mobile robot according to a second embodiment of the present disclosure will be described with reference to the accompanying drawings. In the second embodiment, the description of the same parts as those in the first embodiment will be omitted. The autonomous mobile robot 10 of the second embodiment performs an axis-deviation correction of the LIDAR 14*a* instead of the update control of the map data with the sensing data of the LIDAR 14*a*.

<Specific Configuration of Processor 11 of Autonomous Mobile Robot 10 of Second Embodiment>

Figure 12:
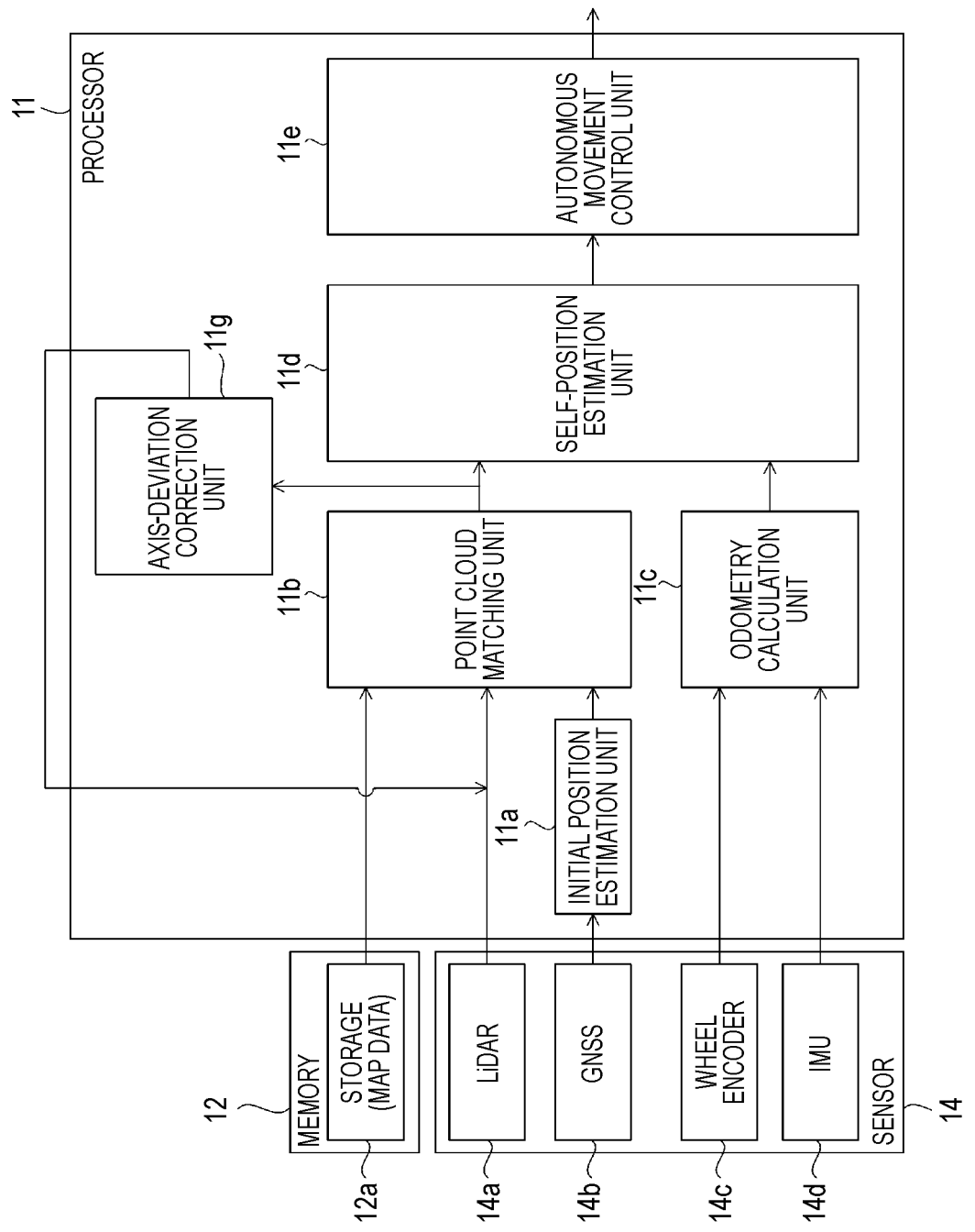
FIG. 12 is a diagram illustrating an example of the specific configuration of the processor 11 of the autonomous mobile robot 10 according to a second embodiment.

FIG. 12 is a diagram illustrating an example of the specific configuration of the processor 11 of the autonomous mobile robot 10 according to the second embodiment. In FIG. 12, the portions similar to those illustrated in FIG. 4 are denoted by the same reference numerals, and the description thereof will be omitted. As illustrated in FIG. 12, the processor 11 of the autonomous mobile robot 10 of the second embodiment includes an axis-deviation correction unit 11g instead of the map data updating unit 11f of the autonomous mobile robot 10 of the first embodiment.

The axis-deviation correction unit 11g performs the axis-deviation correction of the LiDAR 14a based on the result of the point cloud matching by the point cloud matching unit 11b. Specifically, in a case where the matching rate between the map data of the storage 12a and the sensing data of the LiDAR 14a is lower than a second matching rate (second matching degree), the axis-deviation correction unit 11g determines that axis deviation of the LiDAR 14a has occurred, and performs the axis-deviation correction of the LiDAR 14a. The second matching rate may be the same as or different from the first matching rate. For example, the second matching rate is a reference value of the matching rate calculated by the learned model 90, 100, similarly to the first matching rate.

Specifically, the axis-deviation correction unit 11g calculates a correction parameter for correcting the sensing data of the LiDAR 14a (a relative parameter between sensors) to match the map data of the storage 12a Then, the axis-deviation correction unit 11g corrects the sensing data output from the LiDAR 14a based on the calculated correction parameter.

For example, in a case where the maximum matching rate among the matching rates for the respective positions of the environment 20 indicated by the map data is lower than the second matching rate (second matching degree), the axis-deviation correction unit 11g calculates the correction parameter such that the sensing data of the LiDAR 14a matches the data of the position where the matching rate is the maximum among the positions of the environment 20 indicated by the map data.

<Processing by Autonomous Mobile Robot 10 of Second Embodiment>

Figure 13:
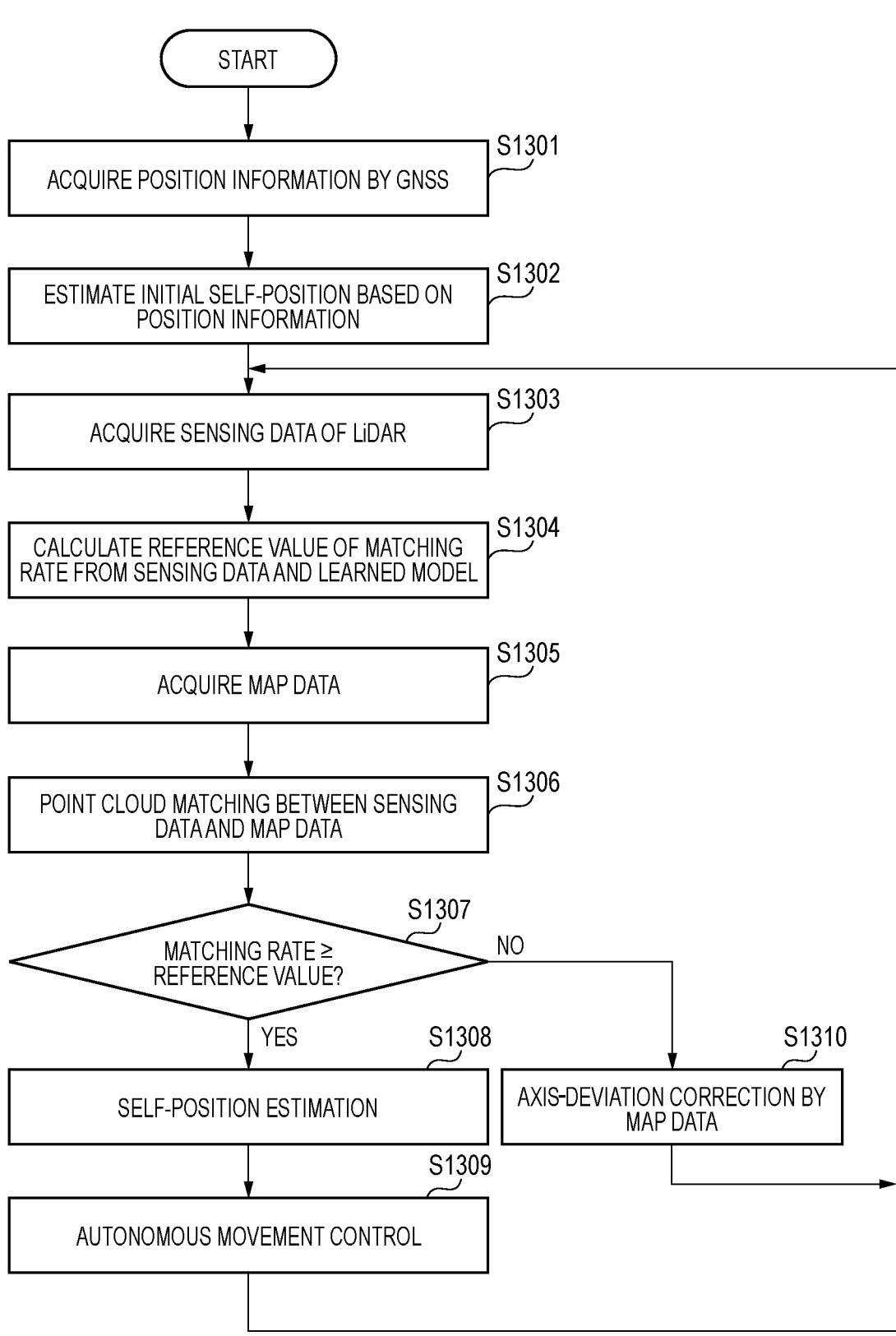
FIG. 13 is a flowchart illustrating an example of the processing by the autonomous mobile robot 10 according to the second embodiment.

FIG. 13 is a flowchart illustrating an example of the processing by the autonomous mobile robot 10 according to the second embodiment. The processor 11 of the autonomous mobile robot 10 of the second embodiment executes, for example, the processing illustrated in FIG. 13. Steps S1301 to S1309 illustrated in FIG. 13 are the same as steps S701 to S709 illustrated in FIG. 7.

In step S1307, if the matching rate is not equal to or greater than the reference value (step S1307: No), the processor 11 performs the axis-deviation correction of the LiDAR 14a (step S1310), and returns to step S1303. In step S1310, the processor 11 calculates the correction parameter for correcting the sensing data of the LiDAR 14a to match the map data of the storage 12a, for example. Then, the processor 11 corrects the sensing data of the LiDAR 14a acquired in the subsequent step S1303 based on the correction parameter calculated in step S1310, and refers to the corrected sensing data in steps S1304 and S1306.

As described above, the autonomous mobile robot 10 of the second embodiment performs the axis-deviation correction of the LiDAR 14a based on the matching rate between the sensing data obtained by the LiDAR 14a and the map data of the storage 12a. Accordingly, it is possible to correct the axis deviation of the LiDAR 14a and prevent a decrease in accuracy of the self-position estimation even if an axis deviation of the LiDAR 14a occurs.

In the processing illustrated in FIG. 13, similarly to the processing illustrated in FIG. 11, when the matching rate is not equal to or greater than the reference value, the processing may proceed to step S1310 in a case only where the matching rate is not equal to or greater than the reference value has continued N times at the same position.

<Specific Position where Autonomous Mobile Robot 10 of Second Embodiment Performs Axis-deviation Correction>

Figure 14:
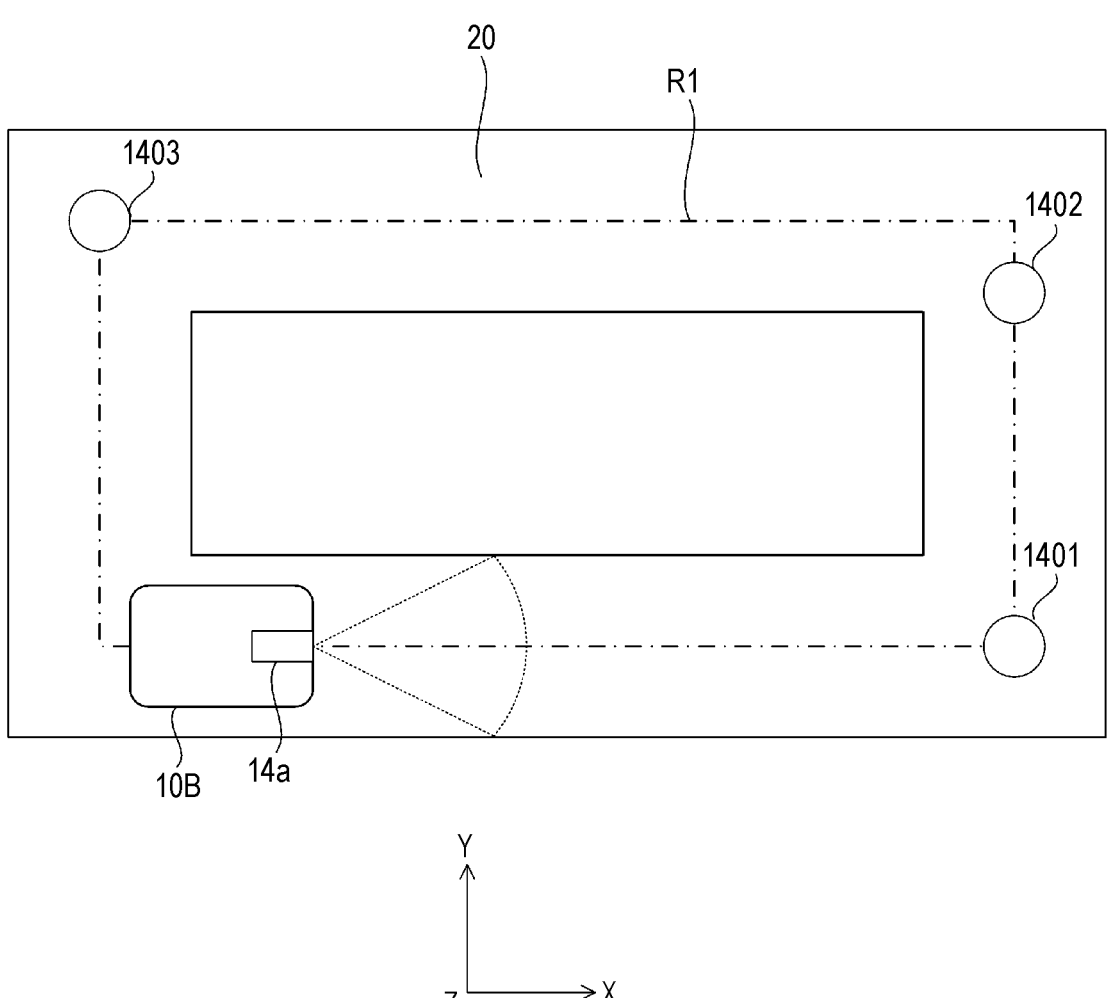
FIG. 14 is a diagram illustrating an example of a specific position at which the autonomous mobile robot 10 according to the second embodiment performs an axis-deviation correction.

FIG. 14 is a diagram illustrating an example of a specific position at which the autonomous mobile robot 10 according to the second embodiment performs the axis-deviation correction. In FIG. 14, the portions similar to those illustrated in FIG. 2 are denoted by the same reference numerals, and the description thereof ill be omitted.

The processor 11 of the autonomous mobile robot 10 of the second embodiment may determine specific positions 1401 to 1403 on the movement route R1 based on the reference value of the matching rate based on the sensing data obtained by the LiDAR 14a The specific positions 1401 to 1403 are, for example, positions where the reference value of the matching rate is equal to or greater than a threshold among the positions of the movement route R1. Alternatively, the specific positions 1401 to 1403 are, for example, M (in this case, M=3) positions having the highest reference values of the matching rate among the positions on the movement route R1. For example, the specific positions 1401 to 1403 are set to positions without dynamic objects (such as a tree shaken by the wind) but rich in surrounding features (such as positions close to buildings with many irregularities).

The processor 11 performs the axis-deviation correction of the LiDAR 14a in a case where the matching rate between the sensing data obtained by the LiDAR 14a when the autonomous mobile robot 10 exists at the specific positions 1401 to 1403 and the map data of the storage 12a is lower than the second matching rate.

By setting the positions where the reference value of the matching rate is high in the environment 20 as the specific positions 1401 to 1403 as described above, and detecting the axis deviation of the LiDAR 14a by comparing the sensing data when the autonomous mobile robot 10 exists at the specific positions 1401 to 1403 with the map data, it is possible to accurately detect and correct the axis deviation of the LiDAR 14a using the sensing data at the positions where the map data and sensing data are likely to match.

In a case where the matching rate between the sensing data obtained by the LiDAR 14a when the autonomous mobile robot 10 exists at a position different from the specific positions 1401 to 1403 and the map data of the storage 12a is lower than the second matching rate, the processor 11 performs control to move the autonomous mobile robot 10 to a specific position (for example, any of the specific positions 1401 to 1403) based on the sensing data obtained by a sensor different from the LiDAR 14a The sensor different from the LiDAR 14a is a sensor provided in the autonomous mobile robot 10, such as the GNSS 14b, the wheel encoder 14c, and the IMU 14d. For example, in a case where the matching rate between the sensing data obtained by the LiDAR 14a when the autonomous mobile robot 10 exists at a position different from the specific positions 1401 to 1403 and the map data of the storage 12a is lower than the second matching rate, the processor 11 controls the autonomous movement of the autonomous mobile robot 10 to perform control to move the autonomous mobile robot 10 to any one of the specific positions 1401 to 1403 by estimating the rough position of the autonomous mobile robot 10 based on the initial position of the autonomous mobile robot 10 estimated by the GNSS 14b and the accumulation result of the movement amount and the posture of the autonomous mobile robot 10 calculated by the odometry calculation based on the sensing data obtained by the wheel encoder 14c and the IMU 14d.

<Other Examples of Processing by Autonomous Mobile Robot 10 of Second Embodiment>

Figure 15:
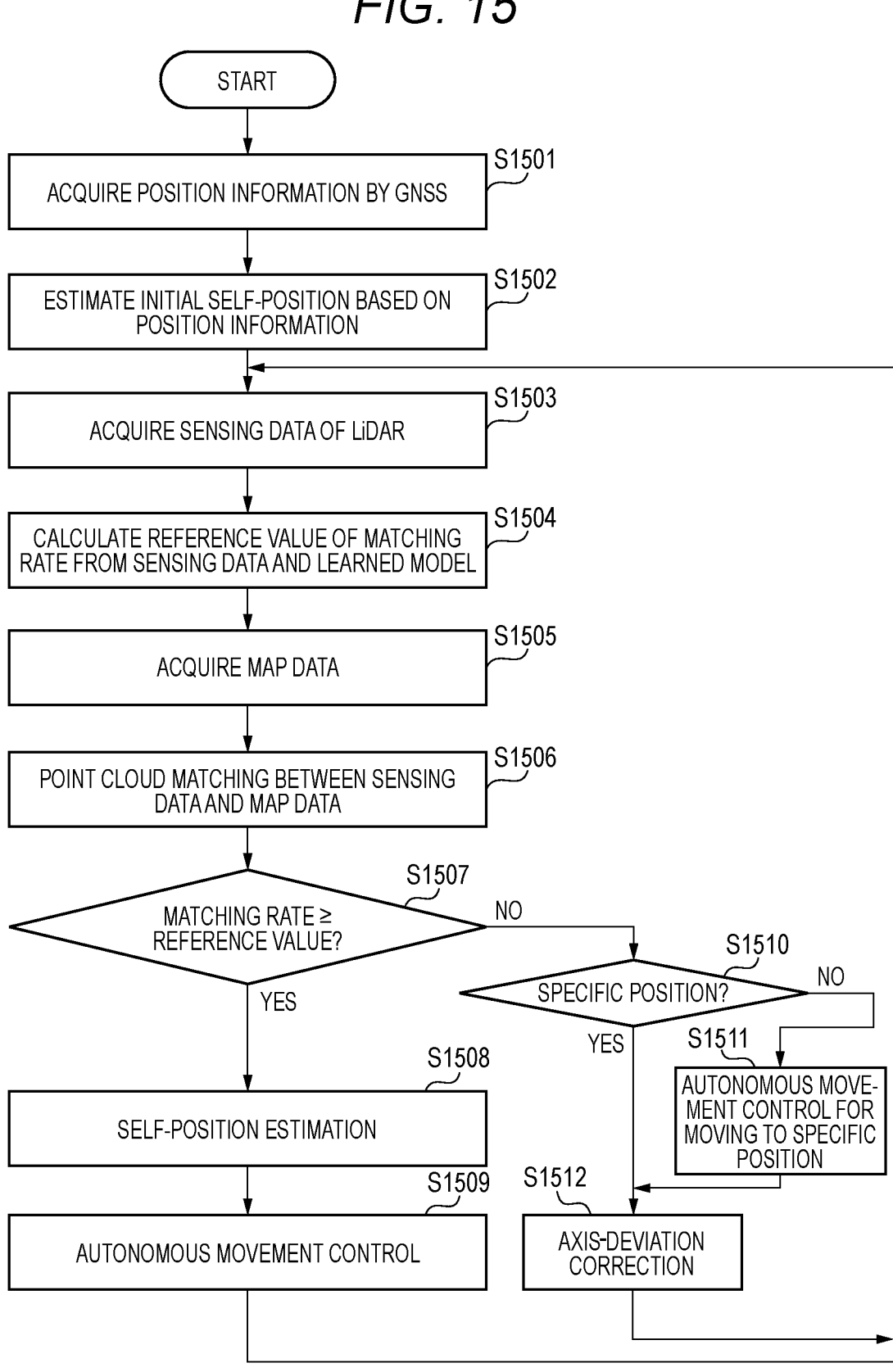
FIG. 15 is a flowchart illustrating another example of the processing by the autonomous mobile robot 10 according to the second embodiment.

FIG. 15 is a flowchart illustrating another example of the processing by the autonomous mobile robot 10 according to the second embodiment. In the example illustrated in FIG. 14, the processor 11 of the autonomous mobile robot 10 according to the second embodiment may execute the processing illustrated in FIG. 15. Steps S1501 to S1509 illustrated in FIG. 15 are the same as steps S1301 to S1309 illustrated in FIG. 13.

In step S1507, if the matching rate is not equal to or greater than the reference value (step S1507: No), the processor 11 determines whether the current position of the autonomous mobile robot 10 is a specific position (for example, any one of the specific positions 1401 to 1403 illustrated in FIG. 14) (step S1510). The current position of the autonomous mobile robot 10 is estimated based on the result of the previous self-position estimation of the autonomous mobile robot 10 or the sensing result of the GNSS 14*b*, the wheel encoder 14*c*, the IMU 14*d*, or the like.

In step S1510, if the current position is not the specific position (step S1510: No), the processor 11 performs autonomous movement control for moving the autonomous mobile robot 10 to the specific position (step S1511), and proceeds to step S1512. In step S1511, for example, the processor 11 roughly estimates the self-position of the autonomous mobile robot 10 based on the result of the previous self-position estimation of the autonomous mobile robot 10 or the sensing result of the GNSS 14*b*, the wheel encoder 14*c*, the IMU 14*d*, or the like, and controls the movement mechanism 15 based on the estimation result to move the autonomous mobile robot 10 to the specific position.

In step S1510, if the current position is the specific position (step S1510: Yes), the processor 11 performs the axis-deviation correction of the LiDAR 14*a* as in step S1310 illustrated in FIG. 13 (step S1512), and returns to step S1503. Accordingly, the autonomous mobile robot 10 can accurately detect the axis deviation of the LiDAR 14*a* and accurately correct the axis deviation of the LiDAR 14*a* based on the sensing data of the LiDAR 14*a* obtained in a state where the autonomous mobile robot 10 exists at the specific position where the reference value of the matching rate is high.

The control of moving the autonomous mobile robot 10 to the specific position based on the sensing data obtained by the sensor different from the LiDAR 14*a* in a case where the matching rate is lower than the second matching rate when the autonomous mobile robot 10 exists at the position different from the specific positions 1401 to 1403 has been described, but is not limited thereto. For example, the sensor 14 of the autonomous mobile robot 10 may be provided with a plurality of LiDARs 14*a*.

The plurality of LiDARs 14*a* may sense the same direction or may sense directions different from each other. The processor 11 may perform control to move the autonomous mobile robot 10 to the specific position based on the sensing data of a LiDAR 14*a* (a LiDAR 14*a* having the matching rate equal to or greater than the second matching rate) among the plurality of LiDARs 14*a* in a case where the matching rate between the sensing data of another one among the plurality of LiDARs 14*a* and the map data is lower than the second matching rate.

Third Embodiment

Hereinafter, an autonomous mobile robot 10 as an autonomous mobile robot according to a third embodiment of the present disclosure will be described with reference to the accompanying drawings. In the third embodiment, the description of the same parts as those in the first and second embodiments will be omitted. The autonomous mobile robot 10 of the third embodiment is capable of can both updating the map data with the sensing data of the LiDAR 14*a* of the first embodiment and performing the axis-deviation correction of the LiDAR 14*a* of the second embodiment, and selectively performs one among both.

<Specific Configuration of Processor 11 of Autonomous Mobile Robot 10 of Third Embodiment>

Figure 16:
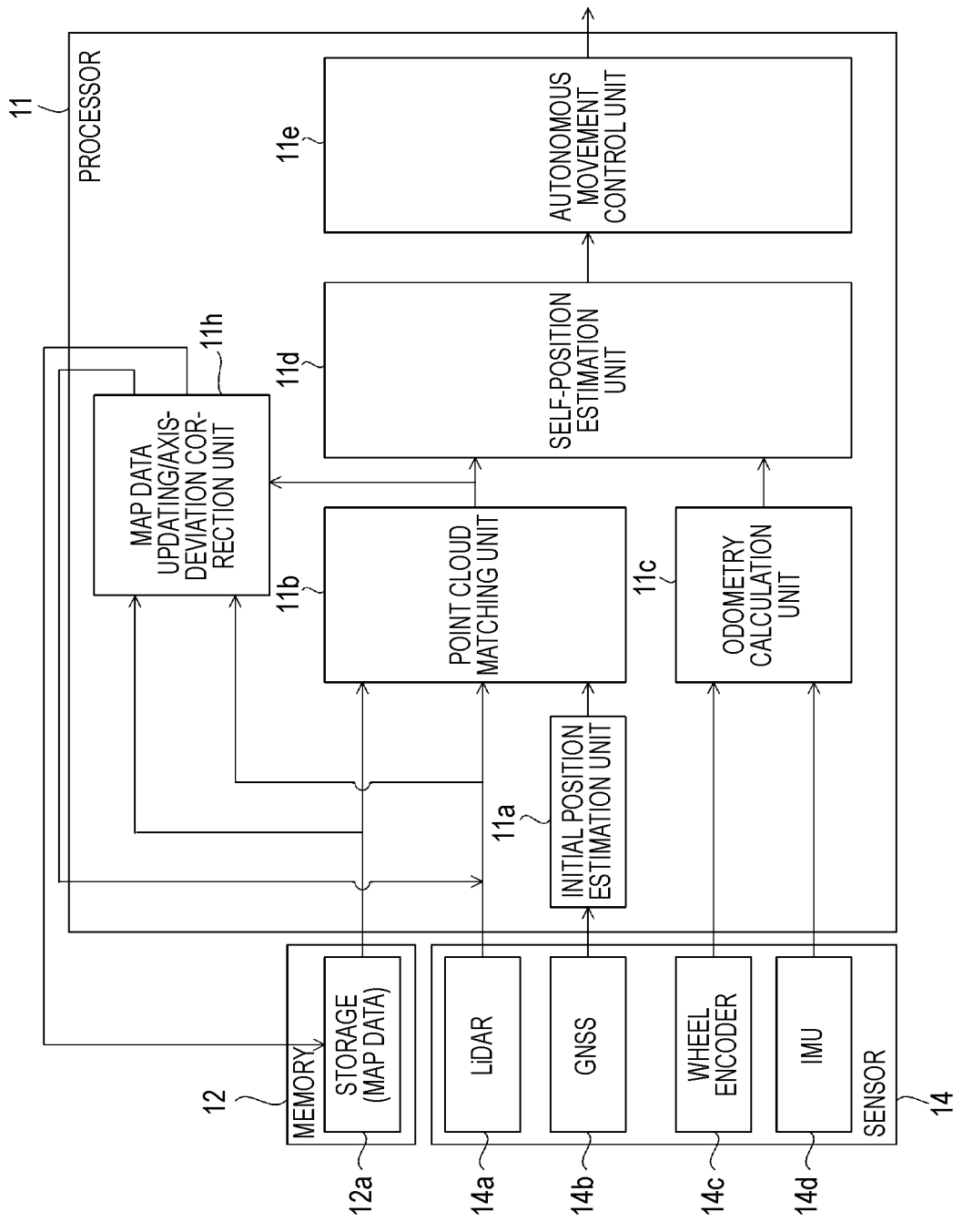
FIG. 16 is a diagram illustrating an example of the specific configuration of the processor 11 of the autonomous mobile robot 10 according to a third embodiment.

FIG. 16 is a diagram illustrating an example of the specific configuration of the processor 11 of the autonomous mobile robot 10 according to the third embodiment. In FIG. 16, the portions similar to those illustrated in FIG. 4 are denoted by the same reference numerals, and the description thereof will be omitted. As illustrated in FIG. 16, the processor 11 of the autonomous mobile robot 10 of the third embodiment includes a map data updating/axis-deviation correction unit 11*h* instead of the map data updating unit 11*f* of the processor 11 of the autonomous mobile robot 10 of the first embodiment.

The map data updating/axis-deviation correction unit 11*h* has both the function of the map data updating unit 11*f* of the first embodiment and the function of the axis-deviation correction unit 11*g* of the second embodiment. Furthermore, in a case where the matching rate between the sensing data of the LiDAR 14*a* and the map data of the storage 12*a* is lower than a third matching rate (third matching degree), the map data updating/axis-deviation correction unit 11*h* determines whether a change of the environment 20 (difference between the environment 20 and the map data) or the LiDAR 14*a* has occurred. The third matching rate may be the same as or different from the first matching rate and the second matching rate. For example, the third matching rate is a reference value of the matching rate calculated by the learned model 90, 100, similarly to the first matching rate and the second matching rate.

For example, the sensor 14 includes a plurality of LiDARs 14*a*, and the map data updating/axis-deviation correction unit 11*h* determines whether a change in the environment 20 or an axis deviation of the LiDAR 14*a* has occurred based on the difference between the sensing data of the plurality of LiDARs 14*a*. Specifically, the map data updating/axis-deviation correction unit 11*h* determines that a change in the environment 20 has occurred if the difference between the sensing data of the plurality of LiDARs 14*a* is less than a predetermined value, and determines that an axis deviation of the LiDAR 14*a* has occurred if the difference between the sensing data of the plurality of LiDARs 14*a* is equal to or greater than the predetermined value.

If it is determined that a change of the environment 20 has occurred, the map data updating/axis-deviation correction unit 11*h* updates the map data of the storage 12*a* with the sensing data of the LiDAR 14*a* If it is determined that an axis deviation of the LiDAR 14*a* has occurred, the map data updating/axis-deviation correction unit 11*h* performs the axis-deviation correction of the LiDAR 14*a*. At this time, the map data updating/axis-deviation correction unit 11*h* performs the axis-deviation correction so that the sensing data of the LiDAR 14*a* whose matching rate is lower than the third matching rate among the plurality of LiDARs 14*a* matches the map data.

<Processing by Autonomous Mobile Robot 10 of Third Embodiment>

Figure 17:
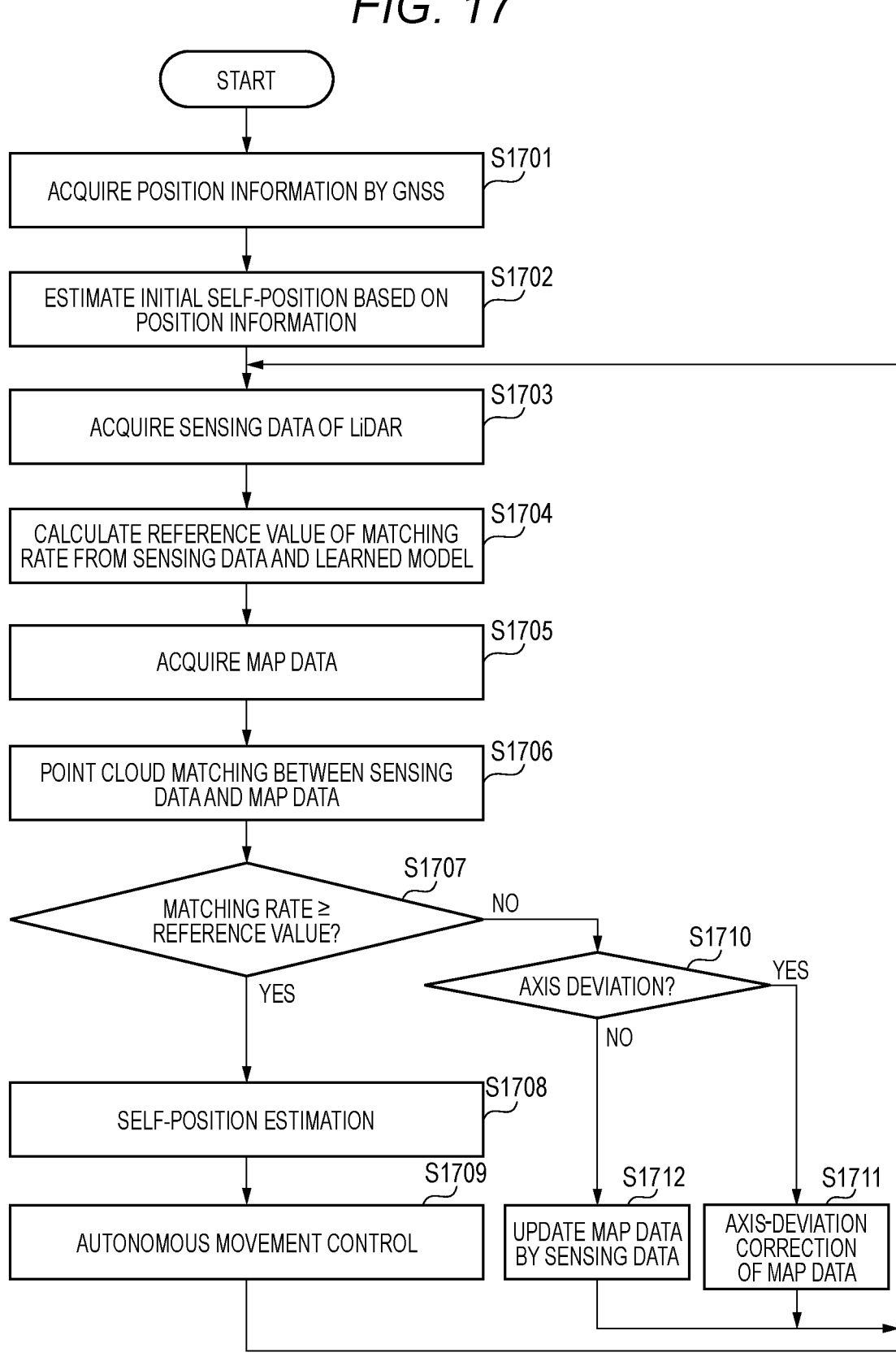
FIG. 17 is a flowchart illustrating an example of the processing by the autonomous mobile robot 10 according to the third embodiment.

FIG. 17 is a flowchart illustrating an example of the processing by the autonomous mobile robot 10 according to the third embodiment. The processor 11 of the autonomous mobile robot 10 of the third embodiment executes, for example, the processing illustrated in FIG. 17. In this example, the sensor 14 includes the LiDARs 14*a*. In this case, the processor 11 performs the processing illustrated in FIG. 17 on each of the plurality of LiDARs 14*a*. In addition, the processor 11 may perform the processing illustrated in FIG. 17 based on the average value or the like of the sensing data of the plurality of LiDARs 14*a* Steps S1701 to S1709 illustrated in FIG. 17 are the same as steps S701 to S709 illustrated in FIG. 7.

In step S1707, if the matching rate is not equal to or greater than the reference value (step S1707: No), the processor 11 determines whether the reason for the low matching rate is an axis deviation of the LiDAR 14*a* (step S1710). For example, if the difference between the sensing data of the plurality of LiDARs 14*a* is equal to or greater than a predetermined value, the processor 11 determines that the reason for the low matching rate is an axis deviation of the LiDAR 14*a*

In step S1710, if the reason for the low matching rate is an axis deviation (step S1710: Yes), the processor 11 performs the axis-deviation correction of the LiDAR 14*a* as in step S1310 illustrated in FIG. 13 (step S1711), and returns to step S1703. If the reason for the low matching rate is not an axis deviation (step S1710: No), the processor 11 updates the map data of the storage 12*a* with the sensing data of the LiDAR 14*a* (step S1712), similarly to step S710 illustrated in FIG. 7, and returns to step S1703.

In the processing illustrated in FIG. 17, similarly as illustrated FIG. 11, when the matching rate is not equal to or greater than the reference value, the processing may proceed to step S1710 in a case only where the state where the matching rate is not equal to or greater than the reference value has continued N times at the same position. In the processing illustrated in FIG. 17, in a case of performing the axis-deviation correction as illustrated in FIG. 15, the axis-deviation correction may be performed after the autonomous movement control for moving the autonomous mobile robot 10 to the specific position is performed.

As described above, the autonomous mobile robot 10 of the third embodiment selects and executes one of the map data update control or the axis-deviation correction of the LiDAR 14*a* based on the difference between the sensing data of the plurality of LiDARs 14*a* in a case where the matching rate between the sensing data obtained from at least one of the plurality of LiDARs 14*a* and the map data in the storage 12*a* is lower than the second matching rate. That is, by comparing the sensing data of the plurality of LiDARs 14*a*, it is possible to distinguish the environmental change and the axis deviation of the LiDAR 14*a* from each other, and to execute appropriate processing among the map data update control and the axis-deviation correction of the LiDAR 14*a*

The embodiment of the present disclosure has been described above, but the present invention is not limited to the embodiment described above, and modifications, improvements, and the like can be made as appropriate. For example, in the embodiments described above, the LiDARs 14*a* have been described as an example of the three-dimensional sensor for three-dimensionally recognizing the external environment of the autonomous mobile robot 10, but the three-dimensional sensor is not limited to the LiDARs 14*a*. For example, the three-dimensional sensor may be a radar that emits radio waves or an ultrasonic sensor that emits ultrasonic waves.

The matching rate has been described as an example of the matching degree between the sensing data and the map data, but the matching degree is not limited to the matching rate indicating the matching degree between the sensing data and the map data as a ratio. That is, the matching degree may be any value indicating the matching degree between the sensing data and the map data.

The above embodiments are described with respect to configurations in which the control device of the present disclosure is applied to the autonomous mobile robot 10 and the autonomous mobile robot 10 performs the autonomous movement control of the autonomous mobile robot 10, the update control of the map data, and the axis-deviation correction, but are not limited to such configurations. For example, the control device of the present disclosure may be applied to an external device capable of communicating with the autonomous mobile robot 10 (a parent device having the autonomous mobile robot 10 as a child).

<Configuration in which Control Device of Present Invention Disclosure is Applied to External Device of Autonomous Mobile Robot 10>

Figure 18:
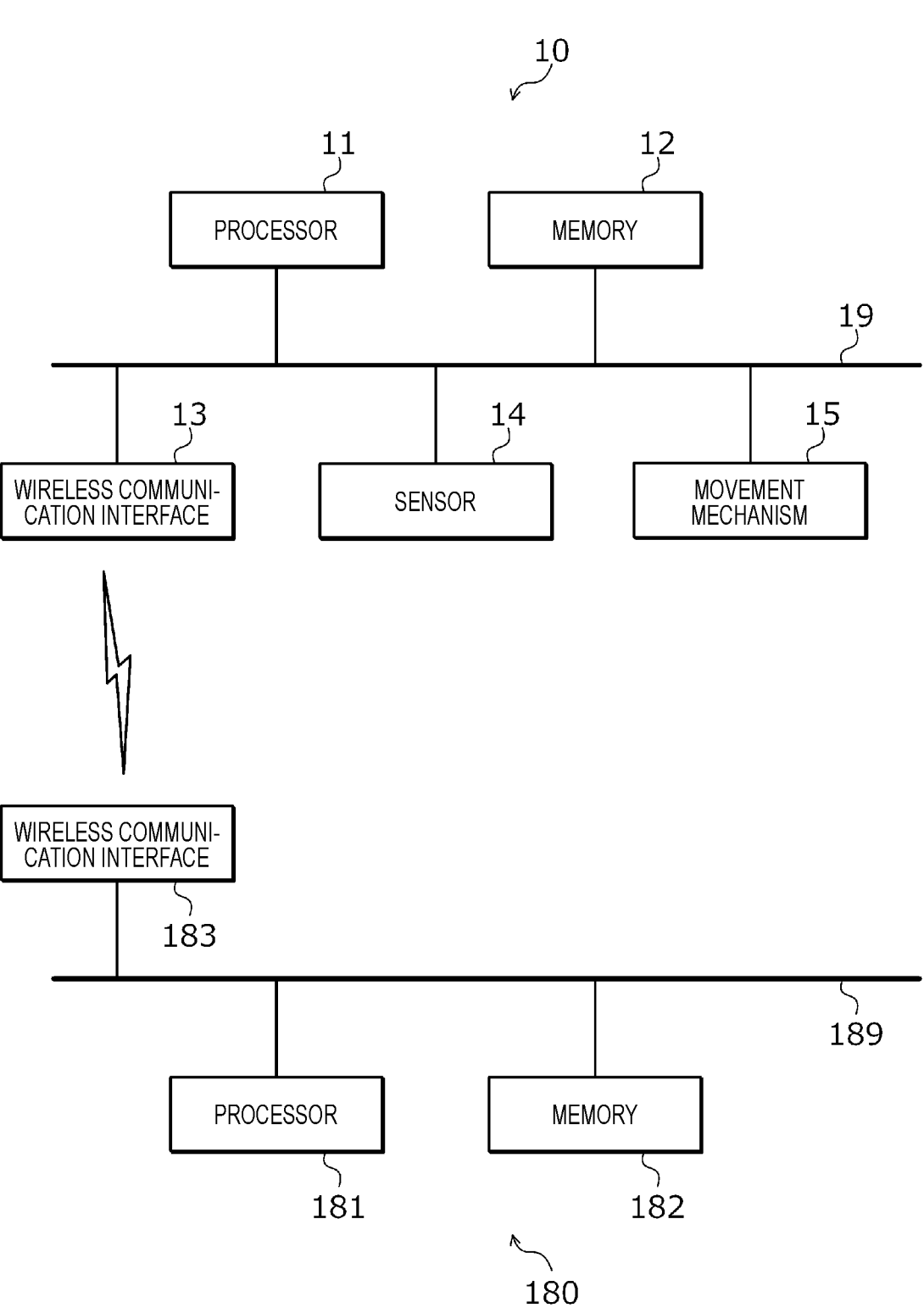
FIG. 18 is a diagram illustrating an example of a configuration in which the control device of the present disclosure is applied to an external device of the autonomous mobile robot 10.

FIG. 18 is a diagram illustrating an example of a configuration in which the control device of the present disclosure is applied to an external device of the autonomous mobile robot 10. The parent device 180 illustrated in FIG. 18 is an example of an external device capable of communicating with the autonomous mobile robot 10. The parent device 180 is installed, for example, near the movement route R1 in which the autonomous mobile robot 10 moves autonomously.

The parent device 180 includes a processor 181, a memory 182, and a wireless communication interface 183. The processor 181, the memory 182, and the wireless communication interface 183 are connected by, for example, a bus 19. The control device of the present disclosure can be applied to, for example, the processor 181.

The processor 181, the memory 182, and the wireless communication interface 183 have the same configurations as the processor 11, the memory 12, and the wireless communication interface 13 illustrated in FIG. 3, respectively. The memory 182 stores the map data indicating the environment 20. The wireless communication interface 183 can perform wireless communication with the wireless communication interface 13 of the autonomous mobile robot 10.

The processor 181 performs the same control as the processor of the autonomous mobile robot 10 by communicating with the autonomous mobile robot 10 via the wireless communication interface 183. For example, the processor 181 receives the sensing data of the autonomous mobile robot 10 from the autonomous mobile robot 10 and controls the autonomous mobile robot 10 based on the received result, thereby performing the autonomous movement control of the autonomous mobile robot 10, the map data update control, and the axis-deviation correction.

In the configuration illustrated in FIG. 18, the autonomous mobile robot 10 may perform some of the autonomous movement control of the autonomous mobile robot 10, the map data update control, and the axis-deviation correction. For example, the autonomous mobile robot 10 may perform the autonomous movement control of the autonomous mobile robot 10, and the parent device 180 may perform the update control of map data and the axis-deviation correction.

In the present specification, at least the following matters are described. Although corresponding constituent elements or the like in the above-described embodiments are shown in parentheses, the present invention is not limited thereto.

(1) A control device (processor 11) relating to a moving body (autonomous mobile robot 10), the moving body including a three-dimensional sensor (LiDAR 14*a*) for three-dimensional recognition of an external environment (environment 20), and being capable of autonomously moving according to a position estimation based on sensing data obtained by the three-dimensional sensor and map data three-dimensionally indicating the external environment, the control device including:

a controller (processor 11) that performs update control of the map data with the sensing data, based on a matching degree between sensing data obtained by the three-dimensional sensor and the map data.

According to (1), by determining a change in the external environment based on the matching degree between the map data and the sensing data, and by updating the map data with the sensing data, it is possible to reflect the environment after the change in the map data and to prevent a decrease in accuracy of the position estimation of the moving body even in a case where the environment changes.

(2) The control device according to (1), in which the controller performs the update control in a case where the matching degree is lower than a first matching degree.

According to (2), by determining that the external environment has changed in the case where the matching degree between the map data and the sensing data is low, and by updating the map data with the sensing data, it is possible to reflect the environment after the change in the map data and to prevent a decrease in accuracy of the position estimation of the moving body even in a case where the environment changes.

(3) The control device according to (2), in which the first matching degree is a reference value of the matching degree based on sensing data obtained by the three-dimensional sensor.

According to (3), it is possible to appropriately determine whether to update the map data, even if the reference value of the matching degree is different for each position in the environment.

(4) The control device according to (2) or (3), in which the controller performs the update control in a case where the matching degree is lower than the first matching degree continuously at a plurality of times at which the moving body exists at a same position.

According to (4), the map data is not updated immediately although the matching degree between the map data and the sensing data is low, and the map data is updated in a case where the matching degree remains low at the same place. Therefore, the map data can be prevented from being updated in a case where the environmental change is temporary.

(5) The control device according to any one of (1) to (4), in which the controller performs an axis-deviation correction of the three-dimensional sensor, based on a matching degree between sensing data obtained by the three-dimensional sensor and the map data.

According to (5), by determining an occurrence of an axis deviation of the three-dimensional sensor based on the matching degree between the map data and the sensing data, and by correcting the axis deviation of the three-dimensional sensor, it is possible to correct the axis deviation of the three-dimensional sensor and prevent a decrease in accuracy of the position estimation of the moving body, even if the axis deviation of the three-dimensional sensor occurs.

(6) The control device according to (5), in which the controller performs the axis-deviation correction in a case where the matching degree is lower than a second matching degree.

According to (6), by determining that an axis deviation of the three-dimensional sensor has occurred in the case where the matching degree between the map data and the sensing data is low, and by correcting the axis deviation of the three-dimensional sensor, it is possible to correct the axis deviation of the three-dimensional sensor and prevent a decrease in accuracy of the position estimation of the moving body, even if the axis deviation of the three-dimensional sensor occurs.

(7) The control device according to (6), in which the controller determines a specific position on a movement route of the moving body on a basis of a reference value of the matching degree based on sensing data obtained by the three-dimensional sensor, and performs the axis-deviation correction in a case where a matching degree between the map data and sensing data obtained by the three-dimensional sensor when the moving body exists at the specific position is lower than the second matching degree.

According to (7), by setting the position where the reference value of the matching degree is high in the environment as the specific position, and by detecting and correcting the axis deviation of the three-dimensional sensor by comparing the map data and the sensing data after the moving body moves to the specific position, it is possible to accurately detect and correct the axis deviation of the three-dimensional sensor using the sensing data at the position where the map data and the sensing data are likely to match.

(8) The control device according to (7), in which the controller performs control to move the moving body to the specific position based on sensing data obtained by a sensor that is provided in the moving body and is different from the three-dimensional sensor, in a case where a matching degree between the map data and sensing data obtained by the three-dimensional sensor when the moving body exists at a position different from the specific position is lower than the second matching degree.

According to (8), it is possible to move the moving body to a position where the map data and the sensing data are likely to match to accurately detect and correct the axis deviation of the three-dimensional sensor, even if an axis deviation occurs in the three-dimensional sensor.

(9) The control device according to (7), in which the moving body includes a plurality of the three-dimensional sensors, and in a case where a matching degree between the map data and sensing data obtained by any one of the three-dimensional sensors when the moving body exists at a position different from the specific position is lower than the second matching degree, the controller performs control to move the moving body to the specific position based on sensing data obtained by another one of the three-dimensional sensors.

According to (9), it is possible to move the moving body to a position where the map data and the sensing data are likely to match to accurately detect and correct the axis deviation of the three-dimensional sensor, even if an axis deviation occurs in the three-dimensional sensor.

(10) The control device according to any one of (5) to (9), in which the moving body includes a plurality of the three-dimensional sensors, and the controller selects and executes one of the update control and the axis-deviation correction, based on a difference between sensing data of the three-dimensional sensors, in a case where a matching degree between the map data and sensing data obtained by at least one of the three-dimensional sensors is lower than a third matching degree.

According to (10), by comparing the sensing data of the plurality of three-dimensional sensors, it is possible to distinguish the environmental change and the axis deviation of the sensor from each other, and to execute appropriate processing among the map data update control and the axis-deviation correction of the three-dimensional sensor.

REFERENCE SIGNS LIST

10: autonomous mobile robot (moving body)
11: processor (control device, controller)
14a LiDAR (three-dimensional sensor)
20 environment (external environment)

The invention claimed is:

1. A control device relating to a moving body, the moving body including a three-dimensional sensor for three-dimensional recognition of an external environment, and being capable of autonomously moving according to a position estimation based on sensing data obtained by the three-dimensional sensor and map data three-dimensionally indicating the external environment, the control device comprising:

a controller that determines whether or not to perform update control of the map data with the sensing data, based on a matching degree between sensing data obtained by the three-dimensional sensor and the map data, wherein the controller performs the update control based on the matching degree being lower than a first matching degree, wherein a movement route of the moving body is divided into a plurality of sections, wherein the first matching degree is a reference value of the matching degree based on sensing data obtained by the three-dimensional sensor, the matching degree being calculated for each section on the movement route in a state where an environment thereof does not change, the reference value being determined based on the matching degrees of the sections on the movement route, and wherein the controller performs movement control of the moving body based on the map data.

2. The control device according to claim 1,
wherein the controller performs the update control based on the matching degree being lower than the first matching degree continuously at a plurality of times at which the moving body exists at a same position.

3. The control device according to claim 1,
wherein the controller determines whether or not to perform an axis-deviation correction of the three-dimensional sensor, based on a matching degree between sensing data obtained by the three-dimensional sensor and the map data.

4. The control device according to claim 3,
wherein the controller performs the axis-deviation correction based on the matching degree being lower than a second matching degree.

5. The control device according to claim 4,
wherein the controller determines a specific position on a movement route of the moving body on a basis of a reference value of the matching degree based on sensing data obtained by the three-dimensional sensor, and performs the axis-deviation correction based on a matching degree between the map data and sensing data obtained by the three-dimensional sensor being lower than the second matching degree and the moving body existing at the specific position.

6. The control device according to claim 5,
wherein the controller performs control to move the moving body to the specific position based on sensing data obtained by a sensor that is provided in the moving body and is different from the three-dimensional sensor, a matching degree between the map data and sensing data obtained by the three-dimensional sensor being lower than the second matching degree, and the moving body existing at a position different from the specific position.

7. The control device according to claim 5,
wherein the moving body includes a plurality of the three-dimensional sensors, and
the controller performs control to move the moving body to the specific position based on a matching degree between the map data and sensing data obtained by any one of the three-dimensional sensors being lower than the second matching degree, sensing data obtained by another one of the three-dimensional sensors, and the moving body existing at a position different from the specific position.

8. The control device according to claim 3,
wherein the moving body includes a plurality of the three-dimensional sensors, and
the controller selects and executes one of the update control and the axis-deviation correction, based on a difference between sensing data of the three-dimensional sensors and a matching degree between the map data and sensing data obtained by at least one of the three-dimensional sensors being lower than a third matching degree.

9. The control device according to claim 1,
wherein the reference value is an estimated value, which varies depending on a position on a movement route of the moving body, of the matching degree between the sensing data and the map data on an assumption that an environment in which the moving body moves autonomously does not change.

* * * * *